(12) United States Patent
Breton et al.

(10) Patent No.: US 6,350,795 B1
(45) Date of Patent: *Feb. 26, 2002

(54) INK COMPOSITIONS

(75) Inventors: Marcel P. Breton; Shadi L. Malhotra; Danielle C. Boils; Raymond W. Wong, all of Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/589,263

(22) Filed: Jun. 7, 2000

(51) Int. Cl.$^7$ .................. C09D 11/10; C08K 5/21; C08K 5/36
(52) U.S. Cl. ................. 523/160; 524/211; 524/213
(58) Field of Search ................. 523/160, 161; 106/31.29, 31.43, 31.75, 31.61, 31.32, 31.64; 524/211, 213

(56) References Cited

U.S. PATENT DOCUMENTS

| | | | |
|---|---|---|---|
| 3,985,663 A | 10/1976 | Lu et al. | 252/62.1 L |
| 4,308,547 A | 12/1981 | Lovelady et al. | 346/140 R |
| 4,490,731 A | 12/1984 | Vaught | 346/140 R |
| 4,697,195 A | 9/1987 | Quate et al. | 346/140 R |
| 4,751,528 A | 6/1988 | Spehrley, Jr. et al. | 346/140 R |
| 4,751,529 A | 6/1988 | Elrod et al. | 346/140 R |
| 4,751,530 A | 6/1988 | Elrod et al. | 346/140 R |
| 4,751,534 A | 6/1988 | Elrod et al. | 346/140 R |
| 4,791,439 A | 12/1988 | Guiles | 346/140 R |
| 4,797,693 A | 1/1989 | Quate | 346/140 R |
| 4,801,953 A | 1/1989 | Quate | 346/140 R |
| 4,840,674 A | 6/1989 | Schwarz | 106/22 |
| 4,853,036 A | 8/1989 | Koike et al. | 106/20 |
| 5,006,170 A | 4/1991 | Schwarz et al. | 106/20 |
| 5,028,937 A | 7/1991 | Khuri-Yakub et al. | 346/104 R |
| 5,041,161 A | 8/1991 | Cooke et al. | 106/22 |
| 5,041,849 A | 8/1991 | Quate et al. | 346/140 R |
| 5,111,220 A | 5/1992 | Hadimioglu et al. | 346/140 R |
| 5,121,141 A | 6/1992 | Hadimoglu et al. | 346/140 R |
| 5,122,187 A | 6/1992 | Schwarz et al. | 106/25 |
| 5,124,718 A | 6/1992 | Koike et al. | 346/1.1 |
| 5,286,288 A | 2/1994 | Tobias et al. | 106/20 B |
| 5,371,531 A | 12/1994 | Rezanka et al. | 347/43 |
| 5,382,492 A | 1/1995 | El-Sayed et al. | 430/115 |
| 5,395,434 A * | 3/1995 | Tochihara et al. | 106/31.43 |
| 5,518,534 A | 5/1996 | Pearlstine et al. | 106/20 R |
| 5,531,818 A | 7/1996 | Lin et al. | 106/23 C |
| 5,667,568 A | 9/1997 | Sacripante et al. | 106/20 R |
| 5,693,128 A | 12/1997 | Sacripante et al. | 106/31.27 |
| 5,698,017 A | 12/1997 | Sacripante et al. | 106/31.49 |
| 5,700,316 A | 12/1997 | Pontes et al. | 106/31.58 |
| 5,863,319 A * | 1/1999 | Baker et al. | 106/31.29 |
| 5,876,492 A | 3/1999 | Malhotra et al. | 106/31.58 |
| 5,902,390 A | 5/1999 | Malhotra et al. | 106/31.58 |
| 5,922,117 A | 7/1999 | Malhotra et al. | 106/31.58 |
| 5,931,995 A | 8/1999 | Malhotra et al. | 106/31.58 |
| 5,958,119 A | 9/1999 | Malhotra et al. | 106/31.43 |
| 6,066,200 A * | 5/2000 | Breton et al. | 106/31.43 |
| 6,096,125 A * | 8/2000 | Breton et al. | 106/31.43 |
| 6,113,678 A * | 9/2000 | Malhotra | 106/31.29 |
| 6,132,499 A * | 10/2000 | Wong et al. | 106/31.29 |
| 6,187,082 B1 * | 2/2001 | Goodbrand et al. | 106/31.29 |
| 6,209,429 B1 | 4/2001 | Urso, III et al. | 82/1.11 |

* cited by examiner

Primary Examiner—Vasu Jagannathan
Assistant Examiner—Callie E. Shosho
(74) Attorney, Agent, or Firm—E. O. Palazzo

(57) ABSTRACT

An ink composition containing (1) a complex mixture of a urea compound and an alkylene oxide containing oxyalkylene compound wherein the conductive mixture optionally possesses a melting point of from about 60 to about 120° C.; (2) a polymeric binder with an optional melting point of from about 60 to about 115° C.; (3) a lightfastness component; (4) a lightfast antioxidant, and (5) a colorant.

26 Claims, No Drawings

INK COMPOSITIONS

RELATED PATENTS AND COPENDING APPLICATION

Inks are illustrated in U.S. Pat. No. 5,931,995, U.S. Pat. No. 5,902,390, U.S. Pat. No. 5,876,492, U.S. Pat. No. 5,922,117, and U.S. Pat. No. 5,958,119, the disclosures of each being totally incorporated herein by reference.

Also illustrated in U.S. Pat. No. 6,096,125, the disclosure of which is totally incorporated herein by reference, is an ink composition comprised of (1) a mixture comprised of a salt and an oxyalkylene compound wherein said mixture possesses a melting temperature of from about 60° C. to about 120° C.; (2) an ink vehicle; (3) an amide compound; (4) a lightfastness component; (5) a lightfastness antioxidant; and (6) a colorant. The appropriate components of the U.S. Pat. No. 6,096,125, such as the oxyalkylene mixtures, metal halides, lightfastness components, and specific metal halides like potassium iodide, can be selected for the present invention in embodiments thereof.

BACKGROUND OF THE INVENTION

The present invention is directed to ink compositions and, more specifically, the present invention relates to conductive inks which have the power or quality of transmitting electrical signals generated by electric field assisted acoustic ink jet printing processes and apparatuses, resulting in controlled ink jettability which in turn improves the edge raggedness of the images. The conductivity of a material can be measured in terms of reciprocal of resistivity, which is the capacity for electrical resistance. The conductivity values of the invention inks expressed as log(pico.mho/cm) and recited herein were measured under melt conditions at 150° C. by placing an aluminum electrode in the molten ink and reading the resistivity output on a GenRad 1689 precision RLC Digibridge at a frequency of 1 K.Hz. Conductivity expressed in terms of [log(pico.mho/cm)] is calculated from the reciprocal of resistivity. Generally, the invention inks possess conductivity values in the range of from about 2 to about 8.5 log(picomho/cm), and preferably in the range of from about 6 to about 8.5 log(picomho/cm), with a melting point of between about 60° C. and about 150° C., and preferably between about 70° C. to about 90° C., and such inks are especially useful for electric field assisted acoustic ink jet printing with enhanced jettability, processes and apparatuses, reference, for example, U.S. Pat. No. 5,121,141, U.S. Pat. No. 5,111,220, and U.S. Pat. No. 5,371,531, the disclosures of which are totally incorporated herein by reference, including especially acoustic ink processes as illustrated in some of the aforementioned copending applications and patents, such as an acoustic ink printer for printing images on a record medium.

The inks of the present invention in embodiments thereof can be considered a phase change ink, that is, for example, an ink that changes, for example, the crystal structure of the entire ink components so it is a physico-chemical process that is, for example, more physical rather than chemical, from a liquid state to solid state in a suitable period of time, for example, from about 1 to about 100 milliseconds, and preferably in less than about 10, such as from about 2 to about 7 milliseconds; (1) a conductive mixture of a urea or a thiourea compound and an oxyalkylene compound having a melting point of lower than about 120° C., and preferably between about 75° C. to about 100° C., that, for example, can fill the pores of the paper and with a low acoustic loss value of below about 100 dB/mm; (2) a polymeric binder having a melting point of between about 60° C. to about 120° C., and preferable between about 80° C. to about 100° C., that can improve the adhesion of ink to paper; (3) a lightfast UV absorber; (4) a lightfast antioxidant; (5) and a colorant such as a dye, a pigment or mixtures thereof.

More specifically, the present invention is directed to phase-change acoustic ink compositions comprised of (1) a conductive mixture of an organic compound such as urea, thiourea, and their derivatives and an oxyalkylene compound such as oxyalkylene bisamides such as N,N'-propyleneoxy-propyleneoxy-propylene)-bis-stearamide; N,N'-propyleneoxy-propyleneoxy-propylene oxy-propylene-)-bis-stearamide; poly(alkyleneoxide) alkylates such as N,N'-(ethyleneoxy-ethyleneoxy-ethyleneoxy-ethyleneoxy-ethylene)-stearate; polyoxa-alkanedioate diester such as distearyl-3,6,9-trioxaundecanedioate, having a melting point of between about 75 and about 100° C., and having low acoustic loss and which acoustic loss is below about 100 dB/mm, and preferably in the range of between 25 to about 80 dB/mm; (2) a polymeric binder with, for example, a melting point of between 60 about to about 120° C., and preferably between about 80° C. to about 100° C. enables, for example, adhesion of ink to paper; (3) a UV absorber such as 2,2,6,6-tetramethyl-4-piperidinyl/$\beta,\beta,\beta',\beta'$-tetramethyl-3,9-(2,4,8,10-tetraoxospiro(5,5)-undecane) diethyl]-1,2,3,4-butane tetracarboxylate; (4) an antioxidant such as antimony dialkyl phosphorodithioate; (5) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfast, between about 90 to about 100 percent and superior waterfast between about 95 to about 100 percent values. Moreover, in embodiments of the present invention there is enabled the elimination, or minimization of undesirable paper curl since water need not be present, or minimum amounts less than about 1 percent of water may be selected in embodiments in the invention inks, and it is preferred that there be an absence of water. When water is not present in the inks, a dryer can be avoided thereby minimizing the cost of the acoustic ink jet apparatus and process.

PRIOR ART

U.S. Pat. No. 5,286,288 discloses a hot melt ink composition for use in continuous ink jet printing comprising an electrolyte, an electrolyte-solvating and dissociating compound and an image-forming agent, said ink being solid at about 25° C., said ink liquefying at a temperature between 75° C. and 175° C., and said ink in the liquid stage having a conductivity of greater than about 100 microsiemens/cm 8[log(pico.mho/cm)].

The use of quaternary ammonium compounds as conductivity enhancing agents is known, reference, for example, U.S. Pat. No. 3,985,663 which discloses conductive inks containing quaternary ammonium compounds. The liquid developer has a viscosity suitable for convenient application to an imaged surface in the development of latent electrostatic images and has improved conductivity resulting from incorporating conductivity control agents in the form of quaternary ammonium compounds which are soluble in the carrier of the ink composition. The conductive ink composition can comprise a coloring agent, optionally a binder and a dispersing agent, a carrier and a quaternary ammonium compound soluble in the liquid carrier.

U.S. Pat. No. 5,382,492 discloses quaternary ammonium compounds as charge adjuvants for positive electrostatic liquid developers consisting essentially of (A) a nonpolar liquid having a Kauri-butanol value of less than 30, present in a major amount; (B) thermoplastic resin particles having dispersed therein a quaternary ammonium compound which is substantially insoluble in the nonpolar liquid; (C) a nonpolar liquid soluble ionic or zwitterionic charge director compound. The process of preparation of the electrostatic liquid developer is described. The liquid developers are useful in copying, color proofing including digital color proofing, lithographic printing plates and resists. The conductive inks of this prior art contain thermoplastic resins which can increase the viscosity of inks above, for example, 20 cps at the jetting temperatures of acoustic ink jet printing. The inks of the present invention possesses conductivity of, for example, in the range of 6.4 to about 7.0 [log(pico.mho/ cm)] and are less conductive than those of U.S. Pat. No. 5,382,492 but have lower viscosities in the range of, for example, from about 5 to about 6 cps at a temperature of between about 120° C. to about 150° C. as required for acoustic ink jet printing.

The use of mineral acid salts or organic acid salts in aqueous polar inks are known, reference, for example, U.S. Pat. No. 5,518,534 which discloses an ink set and process for alleviating bleed in printed elements employing a first ink and a second ink, each containing an aqueous carrier medium and a colorant; the colorant in the first ink being a pigment dispersion and the second ink containing a salt of an organic acid or mineral acid having a solubility of at least 10 percent in 100 percent of water at 25° C.

U.S. Pat. No. 5,531,818 discloses a thermal ink jet printing process which comprises (a) incorporating into a thermal ink jet printer an ink composition comprising water, a dye, and pigment particles, and chemically bonded to the surfaces thereof a hydrophilic moiety selected from the group consisting of sulfonic acid salts, phosphoric acid salts, carboxylic acid salts, and mixtures thereof, and (b) causing droplets of the ink to be ejected in an imagewise pattern onto a recording medium by selectively heating the ink in the printer in an imagewise pattern, thereby generating images on the recording medium. The aqueous inks of this prior art are, for example, 10 times more conductive than the inks of the present invention, and the inks of this prior art possess a number of disadvantages in that the ink has a tendency to soak into a plain paper medium, and this is avoided or minimized with the inks of the present invention in embodiments. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more costly than plain paper.

The use of organic or inorganic salts in combination with oxyalkylene compounds, and preferably those with melting points of between about 75 to about of 120° C. in nonaqueous, nonpolar, solid phase-change inks employed in electric field assisted acoustic ink jet printing are not believed illustrated in the above 5,531,818 patent. One advantage of a conductive phase-change ink with salts used in conjunction with electrical-field assist ink jet printing is its ability to print on plain paper with controlled ink drop placement thereby yielding low edge raggedness images. Since the phase-change ink quickly solidifies as it cools, and since it is waxy in nature, it does not normally soak into a paper medium. The inks of the prior art as disclosed in U.S. Pat. No. 5,531,818; and U.S. Pat. No. 5,518,534 contain water which means that these inks usually are not used at 150° C. as the water will evaporate prior to jetting. The inks of the prior art as disclosed in U.S. Pat. No. 3,985,663 and U.S. Pat. No. 5,382,492 contain high boiling liquids which can possibly be used in acoustic ink jet printing but as these inks are still in the liquid form after these are jetted on to paper these smear easily and penetrate into paper yielding high degree of show through.

In acoustic ink printing, the printhead produces approximately 2.2 picoliter droplets by an acoustic energy process. The ink under these conditions should display a melt viscosity of about 5 to 6 centipoise or less at the jetting temperature. Furthermore, once the ink is jetted onto the paper, the ink image should be of excellent crease property, and should be nonsmearing waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties such as a viscosity of 1 to about 10 centipoise at a temperature of from about 75° C. to about 165° C., and solidify or harden after jetting onto paper such that the ink displays a hardness value of from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature so that the ink, which is melted in the apparatus, will not be subject to evaporation or spillage during periods of non-printing. The vehicle selected possesses a low critical temperature to permit the use of the solid ink in a thermal ink jet printer. In thermal ink jet printing processes employing phase-change inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Phase-change ink jets are somewhat similar to thermal ink jets, however, a phase-change ink contains no solvent. Thus, rather than being liquid at room temperature, a phase-change ink is typically a solid or phase-change having a wax-like consistency. These inks usually need to be heated, for example, to approximately 100° C. before the ink melts and turns into a liquid. With phase-change inks, a plurality of ink jet nozzles is provided in a printhead. A piezoelectric vibrating element is located in each ink channel upstream from a nozzle so that the piezoelectric oscillations propel ink through the nozzle. After the phase-change ink is applied to the substrate, freezing on the substrate resolidifies the ink.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more expensive than plain paper.

One advantage of phase-change ink is its ability to print on plain paper since the phase-change ink quickly solidifies as it cools, and since it is waxy in nature, does not normally soak into a paper medium. However, phase-change ink jet system can be cumbersome in structure and in design, that is, the associated integrated electronics of a thermal ink jet head are considerably more compact than those of a phase-change ink jet head.

In addition, U.S. Pat. No. 4,751,528, the disclosure of which is totally incorporated herein by reference, discloses a phase-change ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify phase-change ink in a selected zone more rapidly to avoid offset by a pinch roll coming in contact with the surface of the substrate to which phase-change ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with phase-change inks with an integrally connected ink jet head and reservoir system, the reservoir system including a highly efficient heat conducting plate inserted within an essentially nonheat conducting reservoir housing.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar than the aforementioned '179 and '187, in that, for example, the invention vehicle selected displays acoustic loss values at a viscosity of from about 1 to about 20, and preferably 10 centipoise, when heated to a temperature of from about 125° C. to about 165° C., such that acoustic energy in the printhead can eject an ink droplet onto paper.

U.S. Pat. No. 5,041,161, the disclosure of which is totally incorporated herein by reference, discloses ink jet ink, which is phase-change at room temperature. The inks comprise vehicles, such as acids, aldehydes and mixtures thereof, which are phase-change at temperatures between 20° C. and 45° C. The ink is impulse jetted at an elevated temperature in the range of about 45° C. to about 110° C., at which temperature the ink has a viscosity of about 10 to 15 centipoise.

U.S. Pat. No. 4,853,036 and U.S. Pat. No. 5,124,718 disclose an ink for ink jet recording which comprises a liquid composition essentially comprising a coloring matter, a volatile solvent with a vapor pressure of 1 millimeter Hg or more at 25° C., and a compound being solid at room temperature and having a molecular weight of 300 or more.

U.S. Pat. No. 5,667,568 discloses an ink composition comprised of a colorant and a bisamide with a viscosity of from about 1 centipoise to about 20 centipoise at a temperature of from about 125° C. to about 185° C.

U.S. Pat. No. 5,698,017 discloses an ink composition comprised of a colorant and a vehicle component, and which vehicle component is comprised of the condensation product of an organic acid and an amino alcohol.

U.S. Pat. No. 5,693,128 discloses an ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,700,316 discloses an ink composition comprised of a colorant and a vehicle of a poly (oxyalkylene)-alkylate, a poly (oxyalkylene)-dialkylate, a polyoxa-alkanoate ester, or a polyoxa-alkanedioate diester, and which ink possesses a viscosity of from about 1 centipoise to about 15 centipoise at a temperature of from about 125° C. to about 165° C.

SUMMARY OF THE INVENTION

While the known ink compositions and processes may be suitable for their intended purposes, a need remains for acoustic phase-change conductive ink compositions suitable for electric field assisted ink jet printing. In addition, there is a need for phase-change ink compositions, which are compatible with a wide variety of plain papers and yield photographic quality images on plain and coated papers. Further, there is a need for phase-change ink compositions, which generate high quality, lightfast, and waterfast images on plain papers. There is also a need for phase-change ink jet ink compositions which generate high quality, fast-drying images on a wide variety of plain papers at low cost with high quality text and high quality graphics, and wherein the dye is retained on the paper surface while the ink vehicle can continue to spread within the paper structure. Further, there is a need for phase-change ink jet ink compositions, which exhibit minimal feathering. Additionally, there is a need for phase-change ink jet ink compositions, which exhibit minimal intercolor bleed. There is also a need for phase-change ink jet ink compositions, which exhibit excellent image permanence. Further, there is a need for phase-change ink jet ink compositions, which are suitable for use in acoustic ink jet printing processes. Additionally, there is a need for phase-change hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. Another advantage of the phase-change inks of the present invention is that the spherulite (spherical ink crystals) size during solidification can be reduced from conventional 6 to 9 micrometers to about 1 to 3 micrometers and in certain cases to 1 to 2 micrometers to improve projection efficiency and crease resistance. Moreover, there is a need for inks, especially hot melt inks containing low molecular weight polymers containing oxyalkylene segments or urea compounds with polymers containing oxyalkylene segments complexed with metal halides. These and other needs can be achievable with the inks of the present invention in embodiments thereof.

DETAILED DESCRIPTION OF THE INVENTION

Aspects of the present invention relate to a conductive ink composition comprised of (1) a conductive complex mixture of a urea compound and an alkylene oxide containing oxyalkylene compound wherein the conductive mixture optionally possesses a melting point of from about 60° C. to about 120° C.; (2) a polymeric binder with unoptional melting point of from about 60° C. to about 115° C.; (3) a lightfastness component; (4) a lightfast antioxidant, and (5) a colorant; a conductive ink composition with (1) a conductive mixture which possesses an acoustic-loss value of from about 25 to about 80 dB/mm; (2) a polymeric binder and component 3, 4 and 6 above, and possessing an acoustic-loss value of from about 40 to about 90 dB/mm, and which ink yields images with crease values of from about 2 to about 87, haze values of from about 5 to about 10, gloss values of from about 85 to about 90, and which ink possesses an acoustic-loss value of from about 10 to about 80 dB/mm, a viscosity of from about 1 centipoise to about 10 centipoise, and the conductivity is from about 6.0 to about 6.5 [log(pico.mho/cm)] at a temperature of from about 125° C. to about 165° C.; a conductive ink composition wherein the ink is non-aqueous and wherein the conductive mixture possesses a melting point of from about 75° C. to about 100° C. and is present in an amount of from about 5 to about 95 percent by weight, the polymeric binder possesses a melting point of from about 60° C. to about 115° C. and is present in an amount of from about 35 to about 4 percent by weight, the lightfastness component is a UV absorber present in an amount of from about 20 to about 0.25 percent by weight, the antioxidant is present in an amount of from about 20 to about 0.25 percent by weight, and the colorant is present in an amount of from about 20 to about 0.5 percent by weight and wherein the total amount of all of the ink components is about 100 percent; a conductive ink composition wherein the urea compound is selected from the group consisting of (1) urea; (2) allyl urea; (3) methyl urea; (4) ethyl urea; (5) butyl urea; (6) benzyl urea; (7) phenyl urea; (8) 1,3-dimethyl urea; (9) 1,3-dipropyl urea; and (10) 1,3-dioctadecyl urea; a conductive ink composition wherein the urea is urea, 1-allyl urea or butyl urea, each present in the ink composition in an amount of between about 1 percent by weight to about 15 percent by weight per 100 percent by weight of ink; a conductive ink composition wherein in the conductive mixture the urea compound is a thiourea selected from the group consisting of (1) 1-allyl-2-thiourea; (2) 1-allyl-3-(2-hydroxyethyl)-2-thiourea; (3) 1-methyl-2-thiourea; (4) 1-methallyl-3-methyl-2-thiourea; (5) 1,3-dibutyl-2-thiourea; (6) 1,1,3,3-tetramethyl-2-thiourea (Aldrich #11,516-9); (7) N,N'-di-n-propyl thiourea; (8) 1-benzyl-3-methyl-2-thiourea; and (9) thiourea; a conductive ink composition wherein the thioureas is 1-allyl-2-thiourea, 1-methyl-2-thiourea, thiourea and wherein each are present in the ink composition in amounts of between 1 percent by weight to about 15 percent by weight; a conductive ink composition wherein in the conductive mixture the alkyleneoxide compound is an oxyalkylene amide selected from the group consisting of (1) N,N'-(ethyleneoxy-ethyleneoxy-ethylene)-bis-stearamide; (2) N,N'-(ethyleneoxy-ethyleneoxy-ethylene oxy-ethylene)-bis-stearamide; (3) N, N'-(ethyleneoxy-ethyleneoxy-ethyleneoxy-ethyleneoxy-ethylene)-bis-stearamide; (4) N,N'-(propyleneoxy-propyleneoxy-propylene)-bis-stearamide; (5) N,N'-propylene oxy-propyleneoxy-propyleneoxy-propylene-)-bis-stearamide, and (6) N,N'-propylene oxy-propyleneoxy-propyleneoxy-propyleneoxy-propylene)-bis-stearamide, optionally present in the ink composition in amounts of between about 4 percent by weight to about 80 percent by weight; a conductive ink composition wherein in the conductive mixture the alkyleneoxide containing compound is a poly(oxyalkylene)-alkylate selected from the group consisting of (1) N,N'-propyleneoxy-propyleneoxy-propyleneoxy-propyleneoxy-propylene)-acetate; (2) N,N'-(ethyleneoxy-ethyleneoxy-ethylene)-stearate; (3) N,N'-(ethyleneoxy-ethyleneoxy-ethyleneoxy-ethyleneoxy-ethylene)-stearate; (4) N,N'-(propyleneoxy-propyleneoxy-propylene)-stearate; (5) N,N'-(ethylene oxy-ethyleneoxy-ethylene)-laurate; (6) N,N'-(ethyleneoxy-ethyleneoxy-ethylene oxy-ethyleneoxy-ethylene)-laurate; (7) N,N'-(propyleneoxy-propyleneoxy-propylene)-laurate; (8) N,N'-propyleneoxy-propyleneoxy-propyleneoxy-propylene)-laurate, and (9) N,N'-propyleneoxy-propyleneoxy-propyleneoxy-propylene oxy -propylene)-laurate, optionally present in the ink composition in amounts of between 4 percent by weight to about 80 percent by weight, preferably between 40 percent by weight to about 50 percent by weight, per 100 percent by weight of ink; a conductive ink composition wherein in the conductive mixture the alkyleneoxide containing compound is a poly(oxyalkylene)-dialkylate selected from the group consisting of (1) N,N'-(ethyleneoxy-ethylene oxy-ethylene)-diacetate; (2) N,N'-propyleneoxy-propyleneoxy-propyleneoxy-propylene)-diacetate; (3) N,N'-propyleneoxy-propyleneoxy-propylene oxy-propyleneoxy-propylene)-diacetate; (4) N,N'-(ethyleneoxy-ethyleneoxy-ethylene)-distearate; (5) N,N'-(propyleneoxy-propyleneoxy-propylene)-distearate; (6) N,N'-propyleneoxy-propyleneoxy-propyleneoxy-propyleneoxy-propylene)-distearate; (7) N,N'-(ethyleneoxy-ethyleneoxy-ethyleneoxy-ethyleneoxy-ethylene)-dilaurate; (8) N,N'-(propyleneoxy-propyleneoxy-propylene)-dilaurate; (9) N,N'-propyleneoxy-propyleneoxy-propylene oxy-propylene)-dilaurate, and (10) N,N'-propyleneoxy-propyleneoxy-propyleneoxy-propyleneoxy-propylene)-dilaurate, and the like, optionally present in the ink composition in amounts of between 4 percent by weight to about 80 percent by weight, preferably between 40 percent by weight to about 50 percent by weight, per 100 percent by weight of ink; a conductive ink composition wherein in the conductive mixture the alkyleneoxide containing compound is a polyoxa-alkanoate ester selected from the group consisting of (1) methyl 3,6-dioxaheptanoate; (2) butyl 3,6-dioxaheptanoate heptyl 3,6-dioxaheptanoate; (3) octyl 3,6-dioxaheptanoate; (4) dodecyl 3,6-dioxaheptanoate; (5) stearyl 3,6-dioxaheptanoate; (6) ethyl 3,6,9-trioxadecanoate; (7) neopentyl 3,6,9-trioxadecanoate; (8) nonyl 3,6,9-trioxadecanoate; (9) decyl 3,6,9-trioxadecanoate, and (10) stearyl 3,6,9-trioxadecanoate, present in the ink composition in amounts of between about 4 percent by weight to about 80 percent by weight, preferably between 40 percent by weight to about 50 percent by weight, per 100 percent by weight of the ink; a conductive ink composition wherein in the conductive mixture the alkyleneoxide containing compound is a polyoxa-alkanoate diester selected from the group consisting of (1) dimethyl 3,6,9-trioxaundecanedioate; (2) diethyl 3,6,9-trioxaundecanedioate; (3) dipropyl 3,6,9- trioxaundecanedioate; (4) isopropyl 3,6,9-trioxaundecanedioate; (5) dibutyl 3,6,9-trioxaundecanedioate; (6) dihexyl 3,6,9-trioxaundecanedioate; (7) diheptyl 3,6,9-trioxaundecanedioate; (8) dioctyl 3,6,9-trioxaundecanedioate; (9) dinonyl 3,6,9-trioxaundecanedioate, and (10) didodecyl 3,6,9-trioxaundecanedioate, optionally present in the ink composition in amounts of between about 4 percent by weight to about 80 percent by weight, preferably between 40 percent by weight to about 50 percent by weight, per 100 percent by weight of the ink; a conductive ink composition wherein the alkyleneoxide compound is selected from the group consisting of (1) poly(oxymethylene); (2) poly (oxyethylene); (3) ethylene oxide/propylene oxide copolymers; (4) ethylene oxide/propylene oxide/ethylene oxide triblock copolymer; (5) propylene oxide/ethylene oxide/propylene oxide triblock copolymer; (6) ethylene oxide/2-hydroxyethyl methacrylate/ethylene oxide; (7) ethylene oxide/hydroxypropyl methacrylate/ethylene oxide triblock copolymer; (8) ethylene oxide/4-vinyl pyridine/ethylene oxide triblock copolymers; (9) ionene/ethyleneoxide/ionene triblock copolymer; (10) ethylene oxide/isoprene/ethylene oxide triblock copolymer; (11) epichlorohydrin-ethyleneoxide copolymer, present in the ink composition in amounts of between about 4 percent by weight to about 80 percent by weight, preferably between about 40 percent by weight to about 50 percent by weight, per 100 percent by weight of the ink; a conductive ink composition wherein the polymeric binder is present in an amount of from about 35 percent by weight to about 4 percent by weight and is selected from the group consisting of (1) polyethylene monocarboxylic acid; (2) poly(ethylene-co-acrylic acid); (3) poly(sebacic anhydride); (4) poly(azelaic anhydride); (5) poly(maleic anhydride-alt-1-tetradecene; (6) polyethylene-graft-maleic anhydride; (5) poly(ethylene-co-butylacrylate-co-maleic anhydride); (6) poly(hexamethylene sebacate); (7) poly(1,6-hexamethylene adipate); (8) polyethylene succinate; (9) polyethylene monoalcohol; (10) polyethylene-block-poly(ethylene glycol); and (11) polyethylene oxidized; a conductive ink composition wherein the lightfastness component is selected from the group consisting of (1) 1,1-(1,2-ethane-diyl)bis(3,3,5,5-tetramethyl piperazinone); (2) 2,2,4-trimethyl-1,2-hydro quinoline; (3) 2-(4-benzoyl-3-hydroxyphenoxy) ethylacrylate; (4) 2-dodecyl-N-(1,2,2,6,6-pentamethyl-4-piperidinyl) succinimide; (5) 2,2,6,6-tetramethyl-4-piperidinyl/β,β,β',β'-tetramethyl-3,9-(2,4,8,10-tetra oxospiro(5,5)-undecane) diethyl-1,2,3,4-butane tetracarboxylate, optionally present in amounts of from about 0.25 percent by weight to about 10 percent by weight, and preferably from about 1 percent by weight to about 5 percent by weight per 100 percent by weight of ink; a conductive ink composition wherein the lightfast antioxidant is selected from the group consisting of (1) antimony dialkyl phosphorodithioate; (2) molybdenum oxysulfide dithio carbamate; (3) nickel-bis(o-ethyl(3,5-di-tert-butyl-4-hydroxybenzyl) phosphonate; (4) 4,4'-methylene-bis(dibutyldithio carbamate), and (5) tetra sodium-N-(1,2-dicarboxyethyl)-N-octadecyl sulfosuccinamate, optionally present in an amount of from about 0.25 percent by weight to about 10 percent by weight, and preferably from about 1 percent by weight to about 5 percent by weight per 100 percent by weight of ink; a printing process which comprises incorporating into an acoustic ink jet printer the invention ink, and which ink possesses an acoustic-loss value of from about 10 to about 80 dB/mm, a viscosity of from about 1 centipoise to about 10 centipoise, and a conductivity of from about 6.0 to about 6.5 [log(pico.mho/cm)] at a temperature of from about 125° C. to about 165° C.; and causing droplets of the ink to be ejected in imagewise pattern onto a substrate; a process which comprises (a) providing an acoustic ink printer having a pool of the liquid ink with a free surface, and a printhead including at least one droplet ejector for radiating the free surface of the ink with focused acoustic radiation to eject individual droplets of ink therefrom on demand, the radiation being brought to focus with a finite waist diameter in a focal plane, and which ink optionally yields images with crease values of from about 2 to about 87, haze values of from about 5 to about 10, gloss values of from about 85 to about 90, and which ink possesses an acoustic-loss value of from about 10 to about 80 dB/mm, a viscosity of from about 1 centipoise to about 10 centipoise, and with a conductivity of from about 6.0 to about 6.5 [log(pico.mho/cm)] at a temperature of from about 125° C. to about 165° C.; and causing droplets of the ink to be ejected in imagewise pattern onto a substrate; a conductive ink composition wherein the colorant is a pigment, or a dye present in an amount of from about 0.5 to about 20 percent by weight; a conductive ink composition wherein the colorant is a pigment of carbon black; a conductive ink composition wherein the colorant is cyan, magenta, yellow, black, or mixtures thereof; a conductive ink composition wherein the conductive mixture is present in an amount of from about 5 to about 95 percent by weight, the urea compound is urea, 1-allyl urea or butyl urea; a thiourea compound of 1-allyl-2-thiourea, 1-methyl-2-thiourea, thiourea is present, and the alkyleneoxide compound is selected from the group consisting of N,N'-(ethyleneoxy-ethyleneoxy-ethyleneoxy-ethyleneoxy-ethylene)-bis-stearamide, N,N'-(ethyleneoxy-ethyleneoxy-ethyleneoxy-ethyleneoxy-ethylene)-dilaurate, stearyl 3,6,9-trioxadecanoate; the polymeric binder possesses a melting point of from about 60° C. to about 115° C. and present in an amount of from about 35 to about 4 percent by weight is selected from the group consisting of polyethylene monoalcohol, polyethylene-block-poly(ethylene glycol), polyethylene oxidized; the lightfastness component present in an amount of from about 20 to about 0.25 percent by weight is selected from 2-dodecyl-N-(2,2,6,6-tetramethyl-4-piperidinyl) succinimide, [1,2,2,6,6-pentamethyl-4-piperidinyl/β,β,β',β'-tetramethyl-3,9-(2,4,8,10-tetraoxo spiro (5,5) undecane) diethyl]-1,2,3,4-butane tetracarboxylate; the antioxidant present in an amount of from about 20 to about 0.25 percent by weight is tetra-sodium-N-(1,2-dicarboxyethyl)-N-octadecyl-sulfo succinamate, molybdenum or oxysulfide dithio carbamate, and the colorant is present in an amount of from about 20 to about 0.5 percent by weight; a conductive ink with a conductivity of from about 6.0 to about 6.5 [log(pico.mho/cm)], a viscosity of from about 1 centipoise to about 10 centipoise, and which ink yields images with crease values of between 2 to 7, haze values of between 5 to 10, gloss values between 85 to 90; a conductive ink composition with a conductivity of from about 6.0 to about 6.5 [log(pico.mho/cm)], a viscosity of from about 1 centipoise to about 10 centipoise, and which ink yields images with crease values of between 2 to 7, haze values of between 5 to 10, gloss values between 85 to 90; a conductive ink composition and which ink is free of water and is comprised of 60 percent by weight of conductive mixture of urea (5.4 percent by weight) and N,N'-(ethyleneoxyethyleneoxyethylene)-bis-(stearamide) (54.6 percent by weight); 25 percent by weight of the polymeric binder polyethylene monoalcohol; 5 percent by weight of the UV absorber [1,2,2,6,6-pentamethyl-4-piperidinyl β,β,β',β'-tetramethyl-3,9-(2,4,8,10-tetraoxo spiro (5,5)

undecane) diethyl]-1,2,3,4-butane tetracarboxylate, Mixxim HALS 63, Fairmount Corporation; 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant, and which ink possesses a conductivity of from about 6.0 to about 6.5 [log(pico.mho/cm)]; a conductive ink composition further containing a metal salt thereby forming a complex with the oxyalkylene, which oxyalkylene is a polymer; a conductive ink composition wherein a complex is formed between the urea compound and the alkylene oxide containing oxyalkylene compound; a conductive ink composition wherein the complex is of the formula

A (2:1) COMPLEX OF UREA WITH
STEARAMIDE DERIVATIVE OF EXAMPLE I

Actual Mole Ratio is 1.2:1

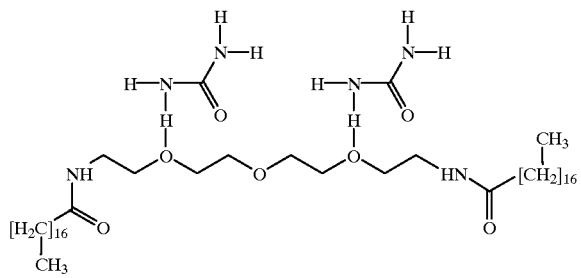

a conductive ink composition wherein the urea is a thiourea; phase-change acoustic ink compositions comprised of (1) a conductive complex of an organic compound such as urea, thiourea, and their derivatives and an oxyalkylene compound such as oxyalkylene bisamides such as N,N'-propyleneoxy-propyleneoxy-propylene)-bis-stearamide; N,N'-propyleneoxy-propyleneoxy-propylene oxy-propylene-)-bis-stearamide; poly(alkyleneoxide) alkylates such as N,N'-(ethyleneoxy-ethyleneoxy-ethyleneoxy-ethyleneoxy-ethylene)-stearate; polyoxa-alkanedioate diester such as distearyl-3,6,9-trioxaundecanedioate, having a melting point of between about 75 and about 100° C., and with low acoustic loss and which acoustic loss is below about 100 dB/mm, and preferably in the range of between about 25 to about 80 dB/mm; (2) a polymeric binder with, for example, a melting point of between about 60° C. to about 120° C., and preferably between about 80° C. to about 100° C.; (3) a UV absorber such as 2,2,6,6-tetramethyl-4-piperidinyl/β,β,β',β'-tetramethyl-3,9-(2,4,8,10-tetraoxospiro (5,5)-undecane) diethyl]-1,2,3,4-butane tetracarboxylate; (4) an antioxidant such as antimony dialkyl phosphorodithioate; (5) a colorant.

A conductive mixture of the urea or thiourea and an oxyalkylene oligomeric compound is present, preferably in the form of a complex in embodiments, for example, in an amount of from about 5 percent by weight to about 95 percent by weight, the polymeric binder is present in the ink composition in an amount of, for example, from about 35 percent by weight to about 4 percent by weight, the lightfastness component or UV absorber is present, for example, in an amount of from about 20 percent by weight to about 0.25 percent by weight, the antioxidant is, for example, present in an amount of from about 20 percent by weight to about 0.25 percent by weight, and the colorant is, for example, present in an amount of from about 20 percent by weight to about 0.25 percent by weight, and wherein the total of all ink components is about 100 percent.

The ink composition contains, for example, the following range amounts of components (1) complex to (5) colorant [5+35+20+20+20=100] to [95+4+0.25+0.25+0.5=100]. The ink composition contains the following preferred range amounts [45+25+10+10+10=100] to [80+5+5+5+5+=100] per 100 percent by weight of ink.

In embodiments, the conductive mixture of oxyalkylene containing compounds with urea and thiourea compounds having an acoustic-loss value of from about 25 to about 80 dB/mm and a melting point of between about 55° C. to about 150° C. is present in an amount of from about 45 percent by weight to about 80 percent by weight, the polymeric binder is present in the ink composition in an amount of, for example, from about 25 percent by weight to about 5 percent by weight, the UV absorber is present in an amount of from about 10 percent by weight to about 5 percent by weight, the antioxidant is present in an amount of from about 10 percent by weight to about 5 percent by weight, and the colorant is present in an amount of from about 10 percent by weight to about 5 percent by weight.

These composition ranges and the other ranges indicated herein were established using a number of known techniques, such as a statistical design based on the analyses of the experimental data of viscosity at 150° C., jettability at 150° C., image quality (high optical density, low crease, high gloss), lightfast, and waterfast values of images generated with various ink compositions.

The inks of the present invention can yield images that are durable (crease between 4 and 60 and preferably between 4 and 20 and more preferably between 4 and 10) and can withstand the pressures of paper-folding such that there is no loss of information. The procedure followed to measure crease on images printed with the inks of the present invention is the same as used in the evaluation of xerographic images. The average width of the creased image due to pressure was obtained on colored and black solid area images printed on paper by (a) folding inwards the printed area of the image; (b) passing on the folded image a standard TEFLON™ coated copper roll 2 inches in width, 3 inches in outer diameter, 2.25 inches inner diameter and weighing 860 grams; (c) unfolding the paper and wiping the loose toner from the creased imaged surface with a cotton swab; and (d) measuring the average width of the ink free creased area with an image analyzer.

In the conductive complex mixture of urea and oxyalkylene compound the urea compounds are, for example, selected from the group consisting of (1) urea, (Aldrich #U270-9); (2) allyl urea, (Aldrich #A3,680-8); (3) methyl urea, (Aldrich #M8,680-4); (4) ethyl urea, (Aldrich #E5,100-7); (5) butyl urea, (Aldrich #B10,300-4); (6) benzylurea, (Aldrich #30,730-0); (7) phenyl urea, (Aldrich #P3,695-9); (8) 1,3-dimethyl urea, (Aldrich #D19,045-4); (9) 1,3-dipropyl urea, (Aldrich #41,762-9); and (10) 1,3-dioctadecyl urea, (Aldrich #32,803-0). The preferred urea compounds include urea, 1-allyl urea and butyl urea and are present in the ink composition in amounts of between 1 percent by weight to about 15 percent by weight, preferably between 5 percent by weight to about 10 percent by weight, per 100 percent by weight of ink.

For the conductive mixture complex of thiourea and oxyalkylene compound, the thiourea compounds are selected, for example, from the group consisting of (1) 1-allyl-2-thiourea, (Aldrich #10,880-41); (2) 1-allyl-3-(2-hydroxyethyl)-2-thiourea, (Aldrich #A3,280-2); (3) 1-methyl-2-thiourea, (Aldrich #M8,460-7); (4) 1-methallyl-3-methyl-2-thiourea, (Aldrich #19,046-2); (5) 1,3-dibutyl-2-thiourea, (Aldrich #D4,959-8); (6) 1,1,3,3-tetramethyl-2- thiourea, (Aldrich #11,516-9); (7) N,N'-di-n-propyl thiourea, (Alfa Organics #A17217); (8) 1-benzyl-3-methyl-2-thiourea, (Aldrich #27,550-6), (9) thiourea, (Aldrich #T3, 355-3). The preferred thioureas include 1-allyl-2-thiourea, 1-methyl-2-thiourea, thiourea and are present in the ink composition in amounts of between 1 percent by weight to about 15 percent by weight, preferably between 5 percent by weight to about 10 percent by weight, per 100 percent by weight of ink.

The conductive mixture of urea or thiourea compounds and oxyalkylene compound present in an amount of from about 5 to about 95 percent by weight and preferably from about 45 to about 80 percent by weight, and wherein the oxyalkylene compounds, for example, are selected from the group consisting of (A) oxyalkylene bisamides as disclosed in U.S. Pat. No. 5,667,568, the disclosure of which is totally incorporated herein by reference, bisamides with a viscosity of from about 1 centipoise to about 20 centipoise at a temperature of from about 125° C. to about 185° C., which bisamide is, for example, selected from the group consisting of (a) N,N'-(ethyleneoxy-ethyleneoxy-ethylene)-bis-stearamide; (b) N,N'-(ethyleneoxy-ethyleneoxy-ethyleneoxy-ethylene)-bis-stearamide; (c) N,N'-(ethyleneoxy-ethyleneoxy-ethyleneoxy-ethyleneoxy-ethylene)-bis-stearamide; (d) N,N'-propyleneoxy-propyleneoxy-propylene)-bis-stearamide; (e) N,N'-propyleneoxy-propyleneoxy-propyleneoxy-propylene-)-bis-stearamide; and (f) N,N'-propyleneoxy propyleneoxy-propyleneoxy-propyleneoxy-propylene)-bis-stearamide. The preferred oxy alkylene amide is N,N'-(ethylene oxy-ethyleneoxy-ethyleneoxy-ethyleneoxy-ethylene)-bis-stearamide, and are present in the ink composition in amounts of between 4 percent by weight to about 80 percent by weight, preferably between 40 percent by weight to about 50 percent by weight, per 100 percent by weight of ink;

(B) poly(oxyalkylene)monoalkylates disclosed in U.S. Pat. No. 5,700,216, the disclosure of which is totally incorporated herein by reference, of the formula ROCO-$(R'-O)_n$-R, such as (a) N,N'-(ethyleneoxy-ethyleneoxy-ethylene)-acetate; (b) N,N'-(ethyleneoxy-ethyleneoxy-ethyleneoxyethylene)-acetate; (c) N,N'-(ethyleneoxy-ethyleneoxy-ethyleneoxy-ethyleneoxy-ethylene)-acetate; (d) N,N'-(propyleneoxy-propyleneoxy-propylene)-acetate; (e) N,N'-propyleneoxy-propyleneoxy-propyleneoxy-propylene)-acetate; (f) N,N'-propyleneoxy-propyleneoxy-propyleneoxy-propyleneoxy-propylene)-acetate; (g) N,N'-(ethyleneoxy-ethyleneoxy-ethylene)-stearate; (h) N,N'-(ethyleneoxy-ethyleneoxy-ethyleneoxy-ethylene)-stearate; (i) N,N'-(ethyleneoxy-ethyleneoxy-ethyleneoxy-ethyleneoxy-ethylene)-stearate; (j) N,N'-(propyleneoxy-propylene oxy-propylene)-stearate; (k) N,N'-propyleneoxy-propyleneoxy-propyleneoxy-propylene)-stearate; (l) N,N'-propyleneoxy-propyleneoxy-propyleneoxy-propyleneoxy-propylene)-stearate; (m) N,N'-(ethyleneoxy-ethyleneoxy-ethylene)-laurate; (n) N,N'-(ethyleneoxy-ethyleneoxy-ethyleneoxy-ethylene)-laurate; (o) N,N'-(ethyleneoxy-ethyleneoxy-ethyleneoxy-ethyleneoxy-ethylene)-laurate; (p) N,N'-(propyleneoxy-propyleneoxy-propylene)-laurate; (q) N,N'-propyleneoxy-propyleneoxy-propyleneoxy-propylene)-laurate; (r) N,N'-propyleneoxy-propyleneoxy-propyleneoxy-propyleneoxy-propylene)-laurate. The preferred poly(oxyalkylene) monoalkylates include N,N'-(ethyleneoxy-ethyleneoxy-ethyleneoxy-ethyleneoxy-ethylene)-acetate, N,N'-propyleneoxy-propyleneoxy-propylene oxy-propyleneoxy-propylene)-stearate, N,N'-propyleneoxy-propyleneoxy-propyleneoxy-propyleneoxy-propylene)-laurate, and are present in the ink composition in amounts of between 4 percent by weight to about 80 percent by weight, preferably between 40 percent by weight to about 50 percent by weight, per 100 percent by weight of ink;

(C) poly(oxyalkylene)dialkylates of the formula ROCO-$(R'-O)_n$-OR such as (a) N,N'-(ethyleneoxy-ethyleneoxy-ethylene)-diacetate; (b) N,N'-(ethylene oxy-ethyleneoxy-ethyleneoxy-ethylene)-diacetate; (c) N,N'-(ethyleneoxy-ethyleneoxy-ethyleneoxy-ethyleneoxy-ethylene)-diacetate; (d) N,N'-(propyleneoxy-propyleneoxy-propylene)-diacetate; (e) N,N'-propyleneoxy-propyleneoxy-propyleneoxy-propylene)-diacetate; (f) N,N'-propyleneoxy-propyleneoxy-propyleneoxy-propyleneoxy-propylene)-diacetate; (g) N,N'-(ethyleneoxy-ethyleneoxy-ethylene)-distearate; (h) N,N'-(ethyleneoxy-ethyleneoxy-ethyleneoxy-ethylene)-distearate; (i) N,N'-(ethyleneoxy-ethyleneoxy-ethyleneoxy-ethyleneoxy-ethylene)-distearate; (j) N,N'-(propyleneoxy-propyleneoxy-propylene)-distearate; (k) N,N'-propyleneoxy-propyleneoxy-propyleneoxy-propylene)-distearate; (l) N,N'-propyleneoxy-propyleneoxy-propyleneoxy-propyleneoxy-propylene)-distearate; (m) N,N'-(ethyleneoxy-ethyleneoxy-ethylene)-dilaurate; (n) N,N'-(ethylene oxy-ethyleneoxy-ethyleneoxy-ethylene)-dilaurate; (o) N,N'-(ethyleneoxy-ethyleneoxy-ethyleneoxy-ethyleneoxy-ethylene)-dilaurate; (p) N,N'-(propyleneoxy-propyleneoxy-propylene)-dilaurate; (q) N,N'-propyleneoxy-propyleneoxy-propyleneoxy-propylene)-dilaurate; (r) N,N'-propyleneoxy-propyleneoxy-propyleneoxy-propyleneoxy-propylene)-dilaurate. The preferred poly(oxyalkylene) dialkylates include N,N'-(ethyleneoxy-ethylene oxy-ethyleneoxy-ethyleneoxy-ethylene)-diacetate, N,N'-propyleneoxy-propyleneoxy-propyleneoxy-propyleneoxy-propylene)-distearate, N,N'-propyleneoxy-propyleneoxy-propyleneoxy-propyleneoxy-propylene)-dilaurate, and are present in the ink composition in amounts of between 4 percent by weight to about 80 percent by weight, preferably between 40 percent by weight to about 50 percent by weight, per 100 percent by weight of ink;

(D) poly(oxyalkylene) esters disclosed in U.S. Pat. No. 5,700,216, the disclosure of which is totally incorporated herein by reference, such as polyoxa-alkanoate ester of the formula ROOC—$CH_2$—$(O$—$R')_n$—OR, such as (a) methyl-3,6-dioxaheptanoate; (b) ethyl-3,6-dioxaheptanoate; (c) propyl-3,6-dioxa heptanoate; (d) isopropyl-3,6-dioxaheptanoate; (e) butyl-3,6-dioxaheptanoate; (f) neopentyl-3,6-dioxaheptanoate; (g) hexyl-,6-dioxaheptanoate; (h) heptyl 3,6-dioxa heptanoate; (i) octyl-3,6-dioxaheptanoate; (j) nonyl-3,6-dioxaheptanoate; (k) decyl-3,6-dioxaheptanoate; (l) dodecyl-3,6-dioxaheptanoate; (m) stearyl-3,6-dioxaheptanoate; (n) methyl-3,6,9-trioxadecanoate; (o) ethyl-3,6,9-trioxadecanoate; (p) propyl-3,6,9-trioxadecanoate; (q) isopropyl-3,6,9-trioxadecanoate; (r) butyl-3,6,9-trioxadecanoate; (s) neopentyl-3,6,9-trioxadecanoate; (t) hexyl-3,6,9-trioxadecanoate; (u) heptyl-3,6,9-trioxadecanoate; (v) octyl-3,6,9-trioxadecanoate; (w) nonyl-3,6,9-trioxadecanoate; (x) decyl-3,6,9-trioxadecanoate; (y) dodecyl-3,6,9-trioxadecanoate, and (z) stearyl-3,6,9-trioxadecanoate. The preferred poly(oxyalkylene) esters include neopentyl-3,6-dioxaheptanoate, dodecyl-3,6-dioxaheptanoate, stearyl 3,6,9-trioxadecanoate, and are present in the ink composition in amounts of between 4 percent by weight to about 80 percent by weight, preferably between 40 percent by weight to about 50 percent by weight, per 100 percent by weight of ink; and (E) polyoxa-alkanedioate diester of the formula ROOC—$CH_2$—$(O$—$R')_n$—O $CH_2$—COOR, such as (a) dimethyl-3, 6,9-trioxaundecanedioate; (b) diethyl-3,6,9-trioxaundecanedioate; (c) dipropyl-3,6,9-trioxaundecanedioate; (d) isopropyl-3,6,9-trioxaundecanedioate; (e) dibutyl-3,6,9-trioxaundecanedioate; (f) dineopentyl-3,6,9-trioxaundecanedioate; (g) dihexyl-3,6,9-trioxa undecanedioate; (h) diheptyl-3,6,9-trioxaundecanedioate; (i) dioctyl-3,6,9-trioxa undecane dioate; (j) dinonyl-3,6,9-trioxaundecanedioate; (k) didecyl-3,6,9-trioxaundecanedioate; (l) didodecyl-3,6,9-trioxaundecanedioate; (m) distearyl-3,6,9-trioxaundecanedioate. The preferred polyoxa-alkanedioate diesters include dineopentyl-3,6,9-trioxaundecanedioate, didecyl-3,6,9-trioxaundecanedioate, didodecyl-3,6,9-trioxaundecanedioate, distearyl-3,6,9-trioxaundecanedioate, and are present in the ink composition in amounts of between 4 percent by weight to about 80 percent by weight, preferably between 40 percent by weight to about 50 percent by weight, per 100 percent by weight of ink.

Examples of other suitable polyoxyalkylene derivatives include (f) poly(oxymethylene), #009, Scientific Polymer Products; poly(oxyethylene) or poly(ethylene oxide), POLY OX WSRN-3000, Union Carbide Corporation; ethylene oxide/propylene oxide copolymers, ethylene oxide/propylene oxide/ethylene oxide triblock copolymer, Alkatronic EGE-31-1, Alkaril Chemicals; propylene oxide/ethylene oxide/propylene oxide triblock copolymers, Alkatronic PGP 3B-1, from Alkaril Chemicals; tetrafunctional block copolymers derived from the sequential addition of ethylene oxide and propylene oxide to ethylene diamine, the content of ethylene oxide in these block copolymers being from about 5 to about 95 percent by weight, such as Tetronic 50R8, BASF Corporation, ethylene oxide/2-hydroxyethyl methacrylate/ethylene oxide and ethylene oxide/hydroxypropyl methacrylate/ethylene oxide triblock copolymers, which can be synthesized via free radical polymerization of hydroxyethyl methacrylate or hydroxypropyl methacrylate with 2-aminoethanethiol using a,a'-azobisisobutyronitrile as initiator and reacting the resulting amino-semitelechelic oligo-hydroxyethyl methacrylate or amino-hydroxypropyl methacrylate with an isocyanate-polyethylene oxide complex in chlorobenzene at 0° C., and precipitating the reaction mixture in diethylether, filtering and drying in vacuum; ethylene oxide/4-vinyl pyridine/ethylene oxide triblock copolymers, which can be synthesized via anionic polymerization of 4-vinyl pyridine with sodium naphthalene as initiator at −78° C. and then adding ethylene oxide monomer, the reaction being carried out in an explosion proof stainless steel reactor; ionene/ethyleneoxide/ionene triblock copolymers, which can be synthesized via quaternization reaction of one end of each 3-3 ionene with the halogenated (preferably brominated) poly(oxyethylene) in methanol at about 40° C.; ethylene oxide/isoprene/ethylene oxide triblock copolymers, which can be synthesized via anionic polymerization of isoprene with sodium naphthalene in tetrahydrofuran as solvent at −78° C. and then adding monomer ethylene oxide and polymerizing the reaction for three days, after which time the reaction is quenched with methanol, the ethylene oxide content in the aforementioned triblock copolymers being from about 20 to about 70 percent by weight and preferably about 50 percent by weight, and the like, and epichlorohydrin-ethyleneoxide copolymer #155 from Scientific Polymer Products and mixtures thereof. The preferred polymers include propylene oxide/ethylene oxide/propylene oxide triblock copolymers, ionene/ethyleneoxide/ionene triblock copolymers ethylene oxide/isoprene/ethylene oxide triblock copolymers and are present in the ink composition in amounts of between 4 percent by weight to about 80 percent by weight, preferably between 40 percent by weight to about 50 percent by weight, per 100 percent by weight of ink.

In embodiments, the alkylene oxide containing oxyalkylene possesses a low molecular weight, for example a weight average molecular weight $M_w$ of from about 400 to about 20,000, preferably from about 700 to about 10,000, and wherein a complex is formed between the urea compound and the alkylene oxide containing oxyalkylene compound.

The conductive mixture of a salt and the oxyalkylene compound is generally prepared by (a) dissolving the mixture of the thiourea or urea (melting point lower than about 150° C.) and the oxyalkylene compound at about 25° C. to about 60° C. in a common solvent such as dichloromethane, alcohol, or water for a period of 30 minutes, followed by removal of solvent by distillation under vacuum, or (b) melt blending between about 100° C. to about 150° C. the mixture of the urea or thiourea and a salt (melting point lower than about 150° C.) and the oxyalkylene compound (melting point lower than about 125° C.) and stirring the molten mixture for 30 minutes, and cooling it down to about 25° C. In the conductive mixture, the oxyalkylene compound is present from about 40 percent by weight to about 70 percent by weight and the urea or thiourea is present from about 5 percent by weight to about 10 percent by weight.

The polymeric binder present in the ink composition in an amount of, for example, from about 35 percent by weight to about 4 percent by weight and preferably from about 25 percent by weight to about 5 percent by weight include (1) polyethylene monocarboxylic acid, (Aldrich #40,706-2); (2) poly(ethylene-co-acrylic acid) with acrylic acid content of between 5 and 20 percent; (3) poly(sebacic anhydride) ($M_n$=1900; Tm=80° C.; Aldrich #45,832-5); (4) poly(azelaic anhydride) ($M_n$=1800; Tm=61° C.; Aldrich #45,831-7); (5) poly(maleic anhydride-alt-1-tetradecene, ($M_n$=7300; Tg=65° C.; Aldrich #45,251-3); (6) polyethylene-graft-maleic anhydride with 0.5 weight percent maleic anhydride, (Tm=107° C.; viscosity at 140° C. is 500 cps; Aldrich #45,662-4); (5) poly(ethylene-co-butylacrylate-co-maleic anhydride), 91 percent ethylene; 5.5 percent butyl acrylate; 3.5 percent maleic anhydride; (Mp=107° C.; Aldrich #43,085-4); (6) poly(hexamethylene sebacate) ($M_w$=60,000; Tm=74° C.; #124 Scientific Polymer Products); (7) poly(1,6-hexamethylene adipate) ($M_n$=3800; Tm=65° C.; Aldrich #45,836-8); (8) polyethylene succinate, (Tm=108; Aldrich #18,203-6); (9) polyethylene monoalcohol; ($M_n$=460; viscosity at 150° C. is 3.2 cps; Mp=86° C.; Aldrich #44,447-2), ($M_n$=700; viscosity at 150° C. is 7.9 cps; Mp=110° C.; Aldrich #44,448-0); (10) polyethylene-block-poly(ethylene glycol); ($M_n$=575; 20 percent ethylene oxide; Mp=101° C.; Aldrich #45,900-3) ($M_n$=875; 20 percent ethylene oxide; Mp=105° C.; Aldrich #45,899-6); ($M_n$=920;50 percent ethylene oxide; Mp=106° C.; Aldrich #45,898-8); ($M_n$=1400; 50 percent ethylene oxide; Mp=115° C.; Aldrich #45,896-1); (11) polyethylene oxidized, ($M_n$=1300; viscosity at 125° C. is 225 cps; Aldrich #19,191-4).

The lightfastness components are preferably UV absorbers that primarily protect the developed images from UV degradation and this component is present in amounts of for example, from about 20 percent by weight to about 0.25 percent by weight and preferably from about 10 percent by weight to about 5 percent by weight, examples of which are (1) 1,1-(1,2-ethane-diyl)bis(3,3,5,5-tetramethylpiperazinone), Goodrich Chemicals; (2) 2,2,4-trimethyl-1,2-hydroquinoline, Mobay Corporation; (3) 2-(4-benzoyl-3-hydroxy phenoxy)ethylacrylate; (4) 2-dodecyl- N-(1,2,2,6,6-pentamethyl-4-piperidinyl) succinimide, Aldrich Chemicals; (5) 2,2,6,6-tetramethyl-4-piperidinyl/β, β,β',β'-tetramethyl-3,9-(2,4,8,10-tetraoxo spiro(5,5)-undecane) diethyl]-1,2,3,4-butane tetracarboxylate.

The lightfast antioxidants of the ink compositions that primarily protect images from oxidation are present in amounts of from about 20 percent by weight to about 0.25 percent by weight, and preferably from about 10 percent by weight to about 5 percent by weight, including (1) antimony dialkyl phosphorodithioate; (2) molybdenum oxysulfide dithio carbamate, both available from Vanderbilt Corporation; (3) (nickel-bis(o-ethyl(3,5-di-tert-butyl-4-hydroxybenzyl) phosphonate, Ciba Geigy Corporation; (4) 4,4'-methylene-bis(dibutyldithio carbamate), Vanlube 7723, Vanderbilt Corporation; (5) tetra-sodium-N-(1,2-dicarboxyethyl)-N-octadecyl sulfosuccinamate, American Cyanamid Corporation.

Suitable colorants, present in an effective amount generally of from about 20 percent by weight to about 0.5 percent by weight, and preferably from about 10 percent by weight to about 5 percent by weight, include pigments and dyes, with solvent dyes being preferred. Any dye or pigment may be chosen, provided that it is capable of being dispersed or dissolved in the vehicle and is compatible with the other ink components. Colorants include pigments, dyes, mixtures thereof, mixtures of dyes, mixtures of pigments, and the like.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange), (Matheson, Colemen Bell); Sudan II (Orange), (Matheson, Colemen Bell); Sudan Orange G (Aldrich #), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (DuPont); Paliogen Black L0084 (BASF); Pigment Black K801 (BASF); and carbon blacks such as REGAL 330® (Cabot), Carbon Black 5250, Carbon Black 5750 (Columbia Chemical Company).

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling compounds of the present application. Examples of suitable spirit solvent dyes include Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 (C.I. Solvent Black, C.I. #12195) (BASF); Sudan Blue 670 (C.I. #61554) (BASF); Sudan Yellow 146 9 (C.I. #12700) (BASF); Sudan Red 462 (C.I. #26050) (BASF) are preferred.

The inks of the present invention can be prepared by any suitable method. A colored phase-change ink composition was prepared by mixing 60 percent by weight of the conductive mixture having an acoustic-loss value of less than about 80 dB/mm and a melting point of point of between 75° C. to 120° C.; 25 percent by weight of the polymeric binder having a melting point of between 80° C. to 100° C.; 5 percent by weight of a lightfast UV absorber; 5 percent by weight of lightfast antioxidant and 5 percent by weight of a colorant. The mixture was heated to a temperature of about 120° C. and stirred for a period of about 60 minutes until it formed a homogeneous solution, and subsequently was cooled to 25° C.

The inks of the present invention are particularly suitable for printing processes wherein the substrate, such as paper, transparency material, or the like, is heated during the printing process to facilitate formation of the liquid crystalline phase within the ink. When transparency substrates are employed, temperatures typically are limited to a maximum of about 100° C. to about 110° C., since the polyester typically employed, as the base sheet in transparency sheets, tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

More specifically, the inks of the present invention are particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers has suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively mixture images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing; (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single print head launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Acoustic-loss measurements recited herein were measured as follows: samples of various liquid vehicles and solid paper surface leveling compounds were placed between the two transducers, with the temperature set at 150° C. The samples were let to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and three samples of the same material were measured. The attenuation dB/mm was then calculated by ratioing the amplitude values obtained at different separation distances.

The mixture of conductive complex, the polymeric binder, the UV absorber, and the antioxidant used in phase-change inks are crystalline or semicrystalline in the solid state. A component can be considered crystalline if it is comprised of crystals having regular arrangement of its atoms in the space lattice. When this arrangement of atoms in the space lattice is irregular, the material is considered as amorphous. The in-between state of having part structure crystalline and another part as amorphous is known as semicrystalline. When solidified on a substrate, such as paper or transparency, these phase change ink materials crystallize in spherulitic morphology, and wherein the size of the spherulites is preferably, for example, from about 0.1 to about 10 microns, preferably between about 1 and about 4 microns, in order to have optimum projection efficiency. The opacity increases with the size of the spherulites. The spherulite size can be measured by an optical microscope with cross polarized light or by the low angle solid state light scattering method (R. S. Stein and M. B. Rhodes, *J. Appl. Phys.*, 31, 1873 (1960)). The latter gives an average size from the sample. A monochromatic, vertically polarized light is passed through the sample. The scattered light is analyzed with another nicol prism, with its optic axis horizontal. This is conventionally known as the $H_v$ scattering method. The spherulite size is measured from the location of the maximum intensity in the four-leaf clover scattering pattern. The small spherulite size is also important to have good crease resistance. Large spherulites, of size greater than 5 microns, would lead to brittle prints. It is also the purpose of the present invention to control the size of the spherulites, by formulating blends of the conductive complex and polymeric binder. Furthermore, this invention presents a composition of the conductive mixture, the polymeric binder, a UV absorber and an antioxidant when solidified, the blend forms a disperse phase of small spherulitic crystalline domains in the matrix of each other. This morphology of reduced spherulitic size from about 6 to 9 micrometers to about 0.5 to 2, and more preferably between 0.5 to 1.0 micrometers, measured with an optical microscope, not only improves the projection efficiency, but also increases the crease resistance. Inks with the spherulite size of between 0.5 to 1 micrometer are ideal as these scatter minimum of light thereby improving projection efficiency when printed on transparencies. The resistance to creasing is also increased with reduced spherulite size due to better intramolecular bonding between the ink molecules.

In embodiments, the inks of the present invention may contain a metal halide and oxyalkylene polymer complexes, or metal halides, and which complexes can, for example control or modify the ink conductivity. Metal halide salts that can be selected are illustrated, for example, in U.S. Ser. No. 09/300,332, the disclosure of which is totally incorporated herein by reference, and wherein the salts are selected, for example, in amounts of from about 15 to about 45 weight percent.

The salt may be an organic salt, an inorganic salt, and the like, and may be a hydrated salt or a nonhydrated salt.

Suitable inorganic salt examples include salts of cations such as lithium, sodium, potassium, rubidium, cesium, beryllium, magnesium, calcium, barium, strontium, aluminum, titanium, vanadium, chromium, manganese, iron, cobalt, nickel, copper, zinc, silver, cadmium, tin, antimony, and of anions such as fluoride, chloride, bromide, iodide, sulfide, phosphate, hydrogen phosphate, dihydrogen phosphate, pyrophosphate, polyphosphate, sulfate, hydrogen sulfate (bisulfate), pyrosulfate, sulfite, hydrogen sulfite (bisulfite), pyrosulfite, thiosulfate, carbonate, hydrogen carbonate (bicarbonate), tetraborate, metaborate, nitrate, nitrite, and the like, as well as mixtures thereof.

Specific examples of inorganic salts include potassium iodide (Aldrich #22,194-5); lithium bromide, (Aldrich #30,837-4); potassium bromide (Aldrich #24,341-8); potassium carbonate (Aldrich #20,961-9); potassium carbonate sesquihydrate (Aldrich #24,355-8); potassium chloride (Aldrich #20,800-0); potassium hexafluorophosphate, (Aldrich #20,091-3); potassium hexafluorosilicate (Aldrich #30,666-1); potassium hexafluoro titanate (Aldrich #30,838-2); potassium hexafluorozirconate (Aldrich #33,668-8); potassium hydrogen carbonate (Aldrich #23,720-5); potassium hydrogen sulfate (Aldrich #22,347-6); potassium pyrophosphate (Aldrich #32,243-1); potassium pyrosulfate (Aldrich #30,775-0); potassium sulfate (Aldrich #22,349-2); potassium sulfite (Aldrich #28,981-7); potassium tetrafluoroborate (Aldrich #27,895-5); potassium phosphate monobasic (Aldrich #34,241-6); potassium phosphate tribasic (Aldrich #34,076-6); potassium tetraborate tetrahydrate (Aldrich #28,979-5); sodium bisulfate (Aldrich #30,782-3); sodium bisulfate monohydrate (Aldrich #23,371-4); sodium ammonium hydrogen phosphate tetrahydrate (Aldrich #24,350-7); sodium bisulfite (Aldrich #24,397-3); sodium bromide (Aldrich #22,034-5); sodium carbonate (Aldrich #22,232-1); sodium chloride (Aldrich #31,016-6); sodium hexafluoro aluminate (Aldrich #30,549-9); sodium hexafluoro silicate (Aldrich #25,017-1); sodium hydrogen carbonate (Aldrich #34,094-4); sodium iodide (Aldrich #21,763-8); sodium iodide dihydrate (Aldrich #21,730-1); sodium pyrosulfite (Aldrich #25,555-6); sodium metaborate hydrate (Aldrich #22,870-2); sodium metasilicate (Aldrich #30,781-5); sodium nitrite (Aldrich #34,766-3); sodium perborate tetrahydrate (Aldrich #24,412-0); sodium phosphate monobasic (Aldrich #33,198-8); sodium phosphate monobasic mono hydrate (Aldrich #22,352-0); sodium sulfate (Aldrich #23,931-3); sodium sulfite (Aldrich #20,784-5); sodium tripolyphosphate (Aldrich #23,850-3); sodium trisilicate (Aldrich #35,864-9); sodium thiosulfate pentahydrate (Aldrich #21,724-7); sodium pyrophosphate decahydrate (Aldrich #22,136-8); magnesium bromide hexahydrate (Aldrich #21,684-4); magnesium chloride hexahydrate (Aldrich #20,895-7); magnesium nitrate hexahydrate (Aldrich #23,717-5); magnesium sulfate heptahydrate (Aldrich #23,039-1); magnesium hydrogen phosphate trihydrate (Aldrich #34,075-8); magnesium carbonate magnesium hydroxide pentahydrate (Aldrich #22,766-8); aluminum sulfate hexadecahydrate (Aldrich #22,761-7); aluminum potassium sulfate dodecahydrate (Aldrich #23,708-6); calcium nitrate tetrahydrate (Aldrich #23,712-4); calcium sulfate dihydrate (Aldrich #25,554-8); strontium chloride hexahydrate (Aldrich #25,552-1); zinc chloride, (Aldrich #22,999-7); zinc nitrate hexahydrate (Aldrich #22,873-7); zinc sulfate heptahydrate (Aldrich #22,137-6), magnesium acetate tetrahydrate (Aldrich #22,976-8); zinc stearate (Aldrich #30,756-4), and the like. The inorganic salts of (1) potassium iodide; (2) strontium chloride hexahydrate (Aldrich #25,552-1); (3) magnesium nitrate hexahydrate; (4) magnesium chloride hexahydrate, are preferred in embodiments and are present in the ink composition in amounts of, for example, between about 0.25 percent by weight to about 45 percent by weight, preferably between about 0.75 percent by weight to about 25 percent by weight, and more preferably between about 10 percent by weight to about 20 percent by weight per 100 percent by weight of ink.

Specific examples of suitable organic salts, which are present in the ink composition in various amounts of, for example, between about 0.25 percent by weight to about 45 percent by weight, preferably between about 0.75 percent by weight to about 25 percent by weight, and more preferably between about 10 percent by weight to about 20 percent by weight per 100 percent by weight of ink, include acetic acid lithium salt dihydrate (Aldrich #21,319-5); D-lactic acid lithium salt (Aldrich #23,391-9); acetoacetic acid lithium salt (Aldrich #23,383-6); citric acid trilithium salt hydrate (Aldrich #21,320-9); dodecyl sulfate lithium salt (Aldrich #86,190-1); formic acid potassium salt HCOOK (Aldrich #29,445-4); acetic acid potassium salt (Aldrich #23,649-7); benzoic acid potassium salt (Aldrich #29,000-9); oleic acid potassium salt (Aldrich #29,124-2); 2,4-hexadienoic acid potassium salt (Aldrich #35,976-9); 2-ketoglutaric acid mono potassium salt (Aldrich #27,171-3); potassium oxalate monohydrate (Aldrich #22,342-5); L-tartaric acid dipotassium salt hydrate (Aldrich #28,994-9); D-gluconic acid potassium salt (Aldrich #86,037-9); potassium hydrogen phthalate (Aldrich #17,992-2); citric acid, tripotassium salt monohydrate (Aldrich #36,017-1); 4-sulfo benzoic acid potassium salt (Aldrich #31,063-8); 4-nitrophenyl sulfate potassium salt (Aldrich #85,649-5); 3,5-dimethyl cyclohexyl sulfate potassium salt (Aldrich #25,031-7); 1,3-benzene disulfonic acid dipotassium salt (Aldrich #B315-9); 2,5-dihydroxy-1,4-benzene disulfonic acid dipotassium salt (Aldrich #16,076-8); p-toluene thio sulfonic acid potassium salt (Aldrich #30,432-8); acetic acid sodium salt (Aldrich #22,987-3); propionic acid sodium salt (Aldrich #10,919-3); butyric acid sodium salt (Aldrich #30,341-0); octanoic acid sodium salt (Aldrich #26,939-5); palmitic acid sodium salt (Aldrich #28,690-7); formic acid sodium salt (Aldrich #10,760-3); benzoic acid sodium salt (Aldrich #10,916-9); 4-hydroxybutyric acid sodium salt (Aldrich #H2,222-1); 4-hydroxybenzyl formic acid sodium salt (Aldrich #26,058-4); D,L-2-hydroxy valeric acid sodium salt hydrate (Aldrich #21,998-3); D-gluconic acid sodium salt (Aldrich #18,633-3); 2,2-dichloropropionic acid sodium salt (Aldrich #29,115-3); 3-methyl-2-oxobutanoic acid sodium salt (Aldrich #19,899-4); 4-methyl-2-oxopentanoic acid sodium salt (Aldrich #19,898-6); 2-keto butyric acid sodium salt monohydrate (Aldrich #28,636-2), (2-keto glutaric acid monosodium salt (Aldrich #27,170-5); pyruvic acid sodium salt (Aldrich #P7,622-5); 3-(trimethylsilyl) propionic acid sodium salt (Aldrich #18,033-5); linoleic acid sodium salt (Aldrich #28,643-5); pantothenic acid sodium salt (Aldrich #28,316-9); hippuric acid sodium salt hydrate (Aldrich #27,164-0); 4-amino benzoic acid sodium salt (Aldrich #85,291-0); 4-amino salicylic acid sodium salt dihydrate (Aldrich #85,654-1); phenoxy acetic acid sodium salt hemihydrate (Aldrich #19,422-0); oleic acid sodium salt (Aldrich #23,397-8); succinic acid disodium (Aldrich #22,473-1); dihydroxy tartaric acid disodium salt hydrate (Aldrich #16,342-2); terephthalic acid disodium salt hydrate (Aldrich #28,082-8); malonic acid disodium salt monohydrate (Aldrich #28,654-0); D,L-malic acid disodium salt hydrate (Aldrich #30,849-8); L-tartaric acid disodium salt dihydrate (Aldrich #22,872-9); 4,4'-dihydroxy azobenzene-3,3'-dicarboxylic acid disodium salt (Aldrich #32,680-1); iminodiacetic acid disodium salt monohydrate (Aldrich #I-120-0); ketomalonic acid monohydrate disodium salt (Aldrich #K220-8); fumaric acid disodium salt (Aldrich #23,456-7); maleic acid disodium salt monohydrate (Aldrich #23,457-5); citric acid disodium salt (Aldrich #35,908-4); epoxy succinic acid disodium salt (Aldrich #25,894-6); citric acid trisodium salt dihydrate (Aldrich #85,578-2); D,L-isocitric acid trisodium salt hydrate (Aldrich #22,008-6); nitrilo triacetic acid trisodium salt monohydrate (Aldrich #10,630-5); 1-butane sulfonic acid sodium salt (Aldrich #22,151-1); 1-pentane sulfonic acid sodium salt (Aldrich #22,153-8); 1-hexane sulfonic acid sodium salt (Aldrich #22,154-6); 1-heptane sulfonic acid sodium salt (Aldrich #22,155-4); 1-octane sulfonic acid sodium salt (Aldrich #22,156-2); 1-decane sulfonic acid sodium salt (Aldrich #22,157-0); 1-dodecane sulfonic acid sodium salt (Aldrich #10,643-7); 1-hexadecane sulfonic acid sodium salt (Aldrich #10,641-0); methyl sulfate sodium salt hydrate (Aldrich #31,818-3), octyl sulfate sodium salt (Aldrich #29,424-1); dodecyl sulfate sodium salt (Aldrich #86,201-0); tetradecyl sulfate sodium salt (Aldrich #29,393-8); octadecyl sulfate sodium salt (Aldrich #29,394-6); 4-acetyl benzene sulfonic acid sodium salt (Aldrich #15,892-5); benzene sulfonic acid sodium salt (Aldrich #14,728-1); 4-hydroxybenzene sulfonic acid sodium salt dihydrate (Aldrich #28,298-7); sulfanilic acid sodium salt hydrate (Aldrich #25,128-3); dodecyl benzene sulfonic acid sodium salt (Aldrich #28,995-7); 2-formyl benzene sulfonic acid sodium salt dihydrate (Aldrich #23,938-0); 3-nitrobenzene sulfonic acid sodium salt (Aldrich #N2,200-2); 4-octylbenzene sulfonic acid sodium salt dihydrate (Aldrich #28,748-2); cyclohexyl sulfamic acid sodium salt (Aldrich #13,830-4); diphenyl amine-4-sulfonic acid sodium salt (Aldrich #24,296-9); 2,4-dinitrobenzene sulfonic acid sodium salt (Aldrich #25,993-4); sodium xylene sulfonate (Aldrich #24,253-5); 3,5-dichloro-2-hydroxybenzene sulfonic acid sodium salt (Aldrich #23,882-1); 4-chloro-3-nitrobenzene sulfonic acid sodium salt (Aldrich #22,725-0); 3,5-dibromo sulfanilic acid sodium salt (Aldrich #26,814-3); 1,3-benzene disulfonic acid disodium salt (Aldrich #25,980-2); 4-amino-1-naphthalene sulfonic acid, sodium salt hydrate, 6,7-dihydroxy-2-naphthalene sulfonic acid sodium salt (Aldrich #21,896-0); 3,6-dihydroxy naphthalene-2,7-disulfonic acid disodium salt (Aldrich #23,282-3); 4,5-dihydroxy naphthalene-2,7-disulfonic acid disodium salt dihydrate (Aldrich #21,327-6 and 12,622-5); 2,6-naphthalene disulfonic acid disodium salt (Aldrich #N60-5); 1,3,6-naphthalene trisulfonic acid trisodium salt hydrate (Aldrich #31,074-3); 3-amino-2,7-naphthalene disulfonic acid monosodium salt trihydrate (Aldrich #24,867-3); dioctyl sulfosuccinate sodium salt (Aldrich #D20,117-0); 2-chloroethane sulfonic acid sodium salt monohydrate (Aldrich #15,765-1); 3-chloro-2-hydroxy-1-propane sulfonic acid sodium salt hydrate (Aldrich #32,533-3); 2-methyl-2-propene-1-sulfonic acid sodium salt (Aldrich #18,608-2); vinyl sulfonic acid sodium salt (Aldrich #27,841-6); 3-amino-1-propane sulfonic acid sodium salt dihydrate (Aldrich #A7,612-5); glycerol 2-phosphate disodium salt hydrate (Aldrich #25,129-1); α-D-glucose-1-phosphate disodium salt tetrahydrate (Aldrich #86,217-7); cytidine 5'-monophosphate disodium salt hydrate (Aldrich #85,795-5); pantothenic acid calcium salt monohydrate (Aldrich #29,185-4 and 25,972-1); D-gluconic acid calcium salt (Aldrich #22,764-1); 2-keto-D-gluconic acid, hemicalcium salt dihydrate (Aldrich #28,638-9); 4-methyl-2-oxopentanoic acid calcium salt dihydrate (Aldrich #24,644-1); 3-methyl-2-oxobutanoic acid calcium salt dihydrate (Aldrich #24,643-3); calcium propionate (Aldrich #34,445-1); D,L-glyceric acid calcium salt hydrate (Aldrich #G,500-0); tricalcium dicitrate tetrahydrate (Aldrich #35,973-4); choline chloride phosphate calcium salt (Aldrich #25,045-7); calcium oxalate hydrate (Aldrich #28,984); D-gluconic acid magnesium salt (Aldrich #34,443-5); zinc acetate dihydrate (Aldrich #22,335-2); undecylenic acid, zinc salt, (Aldrich #32,958-4); lactic acid silver salt, (Aldrich #35,975-0); urea phosphate, (Aldrich #29,282-6); urea sulfate (Aldrich #28,059-3). The organic salts of D-lactic acid lithium salt; D-gluconic acid potassium salt; pantothenic acid sodium salt; citric acid disodium salt; 1-dodecane sulfonic acid sodium salt; pantothenic acid calcium salt monohydrate; tricalcium dicitrate tetrahydrate, undecylenic acid zinc salt, magnesium acetate tetrahydrate, urea phosphate and zinc stearate are preferred with undecylenic acid zinc salt, magnesium acetate tetrahydrate, citric acid disodium salt being more preferred.

The optical density values of 2.65 Black (Neozapon Black X51, C.I. #12195); 1.95 (Magenta), (Sudan Red 462, C.I. #26050); 2.05 (Cyan) (Sudan Blue 670, C.I. #61554);1.45 Yellow (Sudan Yellow 146, C.I. #12700), recited herein were obtained on a Pacific Spectrograph Color System. The system consists of two major components, an optical sensor and a data terminal. The optical sensor employs a 6-inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

The lightfast values of ink jet images between 90 to 100 percent, and preferably between 95 to 100 percent, were measured in the Mark V Lightfast Tester obtained from Microscal Company, London, England.

The waterfast values of the above ink jet images were between 90 to 100 percent, and preferably between 95 to 100 percent, were obtained from the optical density data recorded before and after washing with water at 25° C. for five minutes.

The viscosity values of about 6 centipoise recited herein were measured at 150° C. with a Stress Rheometer from Cari-Med model CSL 100. All experiments were performed at a shear rate of 1250 s$^{-1}$. The advantage of these low viscosity inks lies in reduced power consumption by about 35 percent, thereby increased printing speed from about 25 pages per minute to about 40 pages per minute, improved jettability leading to better ink directionality and consequently lower edge raggedness of the prints such as a value of 5 microns, and preferably lower than 3 microns. The edge raggedness is defined as the deviation of the average width of a line measured from the middle of the line to the edge of the line (also known as mid-frequency line-edge noise (MFLEN)) and can be measured with an optical microscope.

The average width of the creased image due to pressure was obtained on colored and black solid area images printed on paper by (a) folding inwards the printed area of the image; (b) passing on the folded image a standard TEFLON™ coated copper roll 2 inches in width, 3 inches in outer diameter, 2.25 inches in inner diameter and weighing 860 grams; (c) unfolding the paper and wiping the loose toner from the creased imaged surface with a cotton swab, and (d) measuring the average width of the toner free creased area with an image analyzer.

The conductivity values expressed as log(picomho/cm) and recited herein were measured under melt conditions at 150° C. by placing an aluminum electrode in the melt and reading the resistivity output on a GenRad 1689 precision RLC Digibridge at a frequency of 1 K.Hz. Conductivity is calculated from the resistivity data.

The haze values of images between 10 to 30, and preferably between 10 to 20, recited herein were measured on images printed on uncoated polyester, such as MYLAR®, with a Haze meter XL-211, HAZEGARD® System obtained from Pacific Scientific Company.

Specific embodiments of the invention will now be described in detail. These examples are intended to be illustrative, and the invention is not limited to the materials, conditions, or process parameters set forth in these embodiments. All percent and percentages are by weight unless otherwise indicated.

EXAMPLE I

The Conductive Complex of Urea and N,N'-(ethyleneoxy ethyleneoxyethylene)-Bis-(Stearamide) Was Prepared As Follows A 300 milliliter Parr reactor equipped with a mechanical stirrer and a distillation apparatus was charged with 284 grams of stearic acid and 96 grams of N,N'-(ethyleneoxyethyleneoxyethylene)-diamine available as JEFFAMINE 192™ from Huntsman Corporation. The mixture was then heated to 165° C. over a 2 hour period, followed by increasing the temperature to 185° C. over a 1 hour period. The pressure was then reduced from atmospheric pressure to 40 millimeters Hg, and these conditions were maintained for an additional 2 hours, wherein the total amount of water collected in the distillation receiver was measured to be about 17 milliliters. The pressure was then increased to atmospheric pressure and the product poured into a metal container and left undisturbed to cool down to room temperature, about 25° C. to about 35° C. throughout. 100 Grams of the above product were then dissolved in 300 grams of methanol with stirring at about 45° C. To this were then added 10 grams of urea and the mixture resulting was allowed to stir at room temperature The dried material displayed a melting point of about 110° C. as measured by a differential scanning calorimeter, a viscosity of 6.5 centipoise at 150° C., and a conductivity of 6.6 log(picomho/cm).

The above product complex formula is, for example, as follows

A (2:1) COMPLEX OF UREA WITH STEARAMIDE DERIVATIVE OF EXAMPLE I

Actual Mole Ratio is 1.2:1

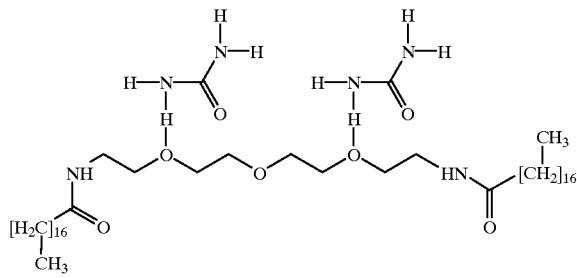

In the above formula, the H, CH$_3$ and CH$_2$ may each be an appropriate alkyl in embodiments.

EXAMPLE II

A black phase change composition that changes from a liquid state to solid state in less than about 100 milliseconds was prepared by mixing 60 percent by weight of the conductive mixture of Example I comprising urea and N,N'-(ethyleneoxyethyleneoxyethylene)-bis-(stearamide) with a melting point of 110° C., a viscosity of 6.5 centipoise at 150° C., and a conductivity of 6.6 log(picomho/cm); 25 percent by weight of the polymeric binder polyethylene monoalcohol; (M$_n$=460; viscosity at 150° C. of 3.2 cps; Mp=86° C.; Aldrich #44,447-2) and a conductivity of 5 [log(pico.mho/cm)]; 5 percent by weight of the UV absorber [1,2,2,6,6-pentamethyl-4-piperidinyl β,β,β',β'-tetramethyl-3,9-(2,4,8,10-tetraoxo spiro (5,5) undecane) diethyl]-1,2,3,4-butane tetracarboxylate, Mixxim HALS 63, Fairmount Corporation; 5 percent by weight of the antioxidant tetra sodium-N-(1,2-dicarboxyethyl)-N-octadecyl sulfosuccinamate, AEROSOL 22N, American Cyanamid Corporation, and 5 percent by weight of the colorant Neozapon Black X51 (C.I. Solvent Black, C.I. #12195) (BASF). The resulting mixture was heated to a temperature of about 120° C. and stirred for a period of about 60 minutes until it formed a homogeneous solution, and subsequently the solution was cooled to 25° C. The black ink resulting had an acoustic loss value of 55 dB/mm, a viscosity of 6.2 cps and a conductivity of 6.5 [log(pico.mho/cm)] at 150° C.

EXAMPLE III

A blue phase-change ink composition was prepared by mixing 60 percent by weight of the conductive mixture of Example I comprising urea and N,N'-(ethyleneoxyethyleneoxyethylene)-bis-(stearamide) with a melting point of 110° C., a viscosity of 6.5 centipoise at 150° C., and a conductivity of 6.6 log(picomho/cm); 25 percent by weight of the polymeric binder polyethylene monoalcohol; ($M_n$=460; viscosity at 150° C. of 3.2 cps; Mp=86° C.; Aldrich #44,447-2) and a conductivity of 5.0 [log(pico.mho/cm)]; 5 percent by weight of the UV absorber 2-dodecyl-N-(2,2,6,6-tetra methyl-4-piperidinyl) succinimide, (Aldrich #41,317-8); 5 percent by weight of an antioxidant tetra sodium-N-(1,2-dicarboxyethyl)-N-octadecyl sulfosuccinamate, AEROSOL 22N, American Cyanamid Corporation, and 5 percent by weight of the colorant Sudan Blue 670 (C.I. #61554) (BASF). The resulting mixture was heated to a temperature of about 120° C. and stirred for a period of about 60 minutes until it formed a homogeneous solution, and subsequently the solution was cooled to 25° C. The blue ink resulting had an acoustic loss value of 55 dB/mm, a viscosity of 6.25 cps and a conductivity of 6.2 [log(pico.mho/cm)] at 150° C.

EXAMPLE IV

A yellow phase-change ink composition was prepared by mixing 60 percent by weight of the conductive mixture of Example I comprising urea and N,N'-(ethyleneoxyethyleneoxyethylene)-bis-(stearamide) with a melting point of 110° C., a viscosity of 6.5 centipoise at 150° C., and a conductivity of 6.6 log(picomho/cm); 25 percent by weight of the polymeric binder polyethylene monoalcohol; ($M_n$=460; viscosity at 150° C. of 3.2 cps; Mp=86° C.; Aldrich #44,447-2) and conductivity of 5.0 [log(pico.mho/cm)]; 5 percent by weight of the UV absorber [1,2,2,6,6-pentamethyl-4-piperidinyl β,β,β',β'-tetramethyl-3,9-(2,4,8,10-tetraoxo spiro (5,5) undecane) diethyl]-1,2,3,4-butane tetracarboxylate, Mixxim HALS 63, Fairmount Corporation; 5 percent by weight of the antioxidant tetra sodium-N-(1,2-dicarboxyethyl)-N-octadecyl sulfosuccinamate, AEROSOL 22N, American Cyanamid Corporation, and 5 percent by weight of the colorant Sudan Yellow 146 [C.I. #12700] (BASF). The mixture resulting was heated to a temperature of about 120° C. and stirred for a period of about 60 minutes until it formed a homogeneous solution, and subsequently was cooled to 25° C. The yellow ink resulting had an acoustic loss value of 56 dB/mm, a viscosity of 6.27 cps and a conductivity of 6.2 [log(pico.mho/cm)] at 150° C.

EXAMPLE V

A red phase-change ink composition was prepared by mixing 60 percent by weight of the conductive mixture of Example I comprising urea and N,N'-(ethyleneoxyethyleneoxyethylene)-bis-(stearamide) with a melting point of 110° C., a viscosity of 6.5 centipoise at 150° C., and a conductivity of 6.6 log(picomho/cm); 25 percent by weight of the polymeric binder polyethylene monoalcohol; ($M_n$=460; viscosity at 150° C. of 3.2 cps; Mp=86° C.; Aldrich #44,447-2) and a conductivity of 5 [log(pico.mho/cm)]; 5 percent by weight of the UV absorber [1,2,2,6,6-pentamethyl-4-piperidinyl β,β,β',β'-tetramethyl-3,9-(2,4,8,10-tetraoxo spiro (5,5) undecane) diethyl]-1,2,3,4-butane tetracarboxylate, Mixxim HALS 63, Fairmount Corporation; 5 percent by weight of the antioxidant tetra sodium-N-(1,2-dicarboxyethyl)-N-octadecyl sulfosuccinamate, AEROSOL 22N, American Cyanamid Corporation, and 5 percent by weight of the colorant Sudan Red 462 [C.I. #26050] (BASF). The mixture was heated to a temperature of about 120° C. and stirred for a period of about 60 minutes until it formed a homogeneous solution, and subsequently was cooled to 25° C. The red ink resulting had an acoustic loss value of 56 dB/mm, a viscosity of 6.27 cps and a conductivity of 6.2 [log(pico.mho/cm)] at 150° C.

EXAMPLE VI

Each of the above four inks from Example II to Example V were incorporated into an acoustic ink jet printing test fixture. A jetting frequency of 160 MHz was used to generate drops of about 2 picoliters, up to 12 drops per pixel at 600 spi. The images formed on paper exhibited excellent color quality with optical density values of 2.95 (black), 2.25 (cyan), 2.15 (magenta), 1.55 (yellow), sharp edges with lightfast values of black (99.5 percent), cyan (98.5 percent), magenta (97 percent), yellow (100 percent), waterfast values of black (98), cyan (99.5 percent), magenta (98.5 percent), yellow (100 percent). The crease values of black, cyan, magenta and yellow ink images were measured at black (2), cyan (5), magenta (7), yellow (7). The images formed on uncoated MYLAR™ exhibited excellent color quality with optical density values of 1.75 (black), 1.66 (cyan), 1.58 (magenta), 0.95 (yellow), sharp edges. The haze values of black, cyan, magenta and yellow ink images were measured at black (8), cyan (7), magenta (5), yellow (9). The gloss values of images were measured at about 90 for all the above inks. The ink spherulite radius was measured between 1 to 2 micrometers leading to haze values of between 5 to 10 when printed on transparencies.

COMPARATIVE EXAMPLE VII

The inks of U.S. Pat. No. 5,698,017, the disclosure of which is totally incorporated herein by reference, comprised of blends of 2-stearyloxazoline, 95 percent by weight and a colorant of Neozapon Black X51 (C.I. Solvent Black, C.I. #12195, BASF); Sudan Blue 670 (C.I. #61554, BASF); Sudan Yellow 146 (C.I. #12700, BASF); Sudan Red 462 (C.I. #26050, BASF); 5 percent by weight (conductivity of 5.5 to 6.0 log pico.mho/cm), generated images on paper having crease values of between 65 to 125, gloss values of 60 to 80, and ink spherulite radius (ink spherulite radius was defined as the radius of the ink spheres formed when the ink cools down from the molten state at the jetting temperature of 150° C. to room temperature of 25° C.) of between 8 to 9 micrometers.

COMPARATIVE EXAMPLE VIII

The inks of copending application U.S. Ser. No. 09/300,332, the disclosure of which is totally incorporated herein by reference, generated images with optical density values of 2.50 (black), 1.92 (cyan), 1.95 (magenta), 1.45 (yellow), sharp edges, with lightfast values of black (99.0 percent), cyan (98.5 percent), magenta (96.7 percent), yellow (99 percent), waterfast values of black (98.5 percent), cyan (97.5 percent), magenta (96 percent), yellow (100 percent). The crease values of black, cyan, magenta and yellow ink images were measured at black (5), cyan (10), magenta (10), yellow (9). The images formed on uncoated MYLAR exhibited excellent color quality with optical density values of 1.55 (black), 1.56 (cyan), 1.48 (magenta), 0.95 (yellow), sharp edges. The haze values of black, cyan, magenta and yellow ink images were measured at black (13), cyan (15), magenta (10), yellow (12). The gloss values of images were measured at about 90 for all the above inks. The ink spherulite radius was measured between 1 to 3 micrometers leading to haze values of between 10 to 15 when printed on transparencies. High unacceptable haze values of, for example, between 10 and 15 result when an imaged transparency is projected on to a screen the light of the projector does not fully pass through the image thus decreasing its projection efficiency from 100 to about 75 or 80 percent and the colors are muddier than normal such as yellow looks like orange, and red looks like dark brown.

Other embodiments and modifications of the present invention may occur to those skilled in the art subsequent to a review of the information presented herein; these embodiments and modifications, as well as equivalents thereof, are also included within the scope of this invention.

What is claimed is:

1. A conductive ink composition comprised of (1) a conductive complex mixture of a urea compound and an alkylene oxide containing oxyalkylene compound wherein said conductive mixture possesses a melting point of from about 60° C. to about 120° C.; (2) a polymeric binder with a melting point of from about 60° C. to about 115° C.; (3) a lightfastness component; (4) a lightfast antioxidant, and (5) a colorant.

2. A conductive ink composition in accordance with claim 1 wherein (1) said conductive mixture possesses an acoustic-loss value of from about 25 to about 80 dB/mm; (2) said polymeric binder possesses an acoustic-loss value of from about 40 to about 90 dB/mm, and which ink yields images with crease values of from about 2 to about 87, haze values of from about 5 to about 10, gloss values of from about 85 to about 90, and which ink possesses an acoustic-loss value of from about 10 to about 80 dB/mm, a viscosity of from about 1 centipoise to about 10 centipoise, and said conductivity is from about 6.0 to about 6.5 [log(pico.mho/cm)] at a temperature of from about 125° C. to about 165° C.

3. A conductive ink composition in accordance with claim 1 and wherein said ink is nonaqueous and wherein the conductive mixture possesses a melting point of from about 75° C. to about 100° C. and is present in an amount of from about 5 to about 95 percent by weight, the polymeric binder possesses a melting point of from about 60° C. to about 115° C. and is present in an amount of from about 35 to about 4 percent by weight, the lightfastness component is a UV absorber present in an amount of from about 20 to about 0.25 percent by weight, the antioxidant is present in an amount of from about 20 to about 0.25 percent by weight, and the colorant is present in an amount of from about 20 to about 0.5 percent by weight and wherein the total amount of all of the ink components is about 100 percent.

4. A conductive ink composition in accordance with claim 1 wherein the urea compound is selected from the group consisting of (1) allyl urea; (2) methyl urea; (3) ethyl urea; (4) butyl urea; (5) benzyl urea; (6) phenyl urea; (7) 1,3-dimethyl urea; (8) 1,3-dipropyl urea; and (9) 1,3-dioctadecyl urea.

5. A conductive ink composition in accordance with claim 1 wherein the urea is 1-allyl urea or butyl urea, each present in the ink composition in an amount of between about 1 percent by weight to about 15 percent by weight per 100 percent by weight of ink.

6. A conductive ink composition in accordance with claim 1 wherein in the conductive mixture the compound is a thiourea selected from the group consisting of (1) 1-allyl-2-thiourea; (2) 1-allyl-3-(2-hydroxyethyl)-2-thiourea; (3) 1-methyl-2-thiourea; (4) 1-methallyl-3-methyl-2-thiourea; (5) 1,3-dibutyl-2-thiourea; (6) 1,1,3,3-tetramethyl-2-thiourea (Aldrich #11,516-9); (7) N,N'-di-n-propyl thiourea; (8) 1-benzyl-3-methyl-2-thiourea; and (9) thiourea.

7. A conductive ink composition in accordance with claim 6 wherein the thiourea is 1-allyl-2-thiourea, 1-methyl-2-thiourea, thiourea and wherein each are present in the ink composition in amounts of between about 1 percent by weight to about 15 percent by weight.

8. A conductive ink composition in accordance with claim 1 wherein in the conductive mixture the alkyleneoxide compound is an oxyalkylene amide selected from the group consisting of (1) N,N'-(ethyleneoxy-ethyleneoxy-ethylene)-bis-stearamide; (2) N,N'-(ethyleneoxy-ethyleneoxy-ethylene oxy-ethylene)-bis-stearamide; (3) N,N'-(ethyleneoxy-ethyleneoxy-ethyleneoxy-ethyleneoxy-ethylene)-bis-stearamide; (4) N,N'-(propyleneoxy-propyleneoxy-propylene)-bis-stearamide; (5) N,N'-propyleneoxy-propyleneoxy-propyleneoxy-propylene-)-bis-stearamide, and (6) N,N'-propylene oxy-propyleneoxy-propyleneoxy-propyleneoxy-propylene)-bis-stearamide, present in the ink composition in amounts of between about 4 percent by weight to about 80 percent by weight.

9. A conductive ink composition in accordance with claim 1 wherein in the conductive mixture the alkyleneoxide containing compound is a poly(oxyalkylene)-alkylate selected from the group consisting of (1) N,N'-propyleneoxy-propyleneoxy-propyleneoxy-propyleneoxy-propylene)-acetate; (2) N,N'-(ethyleneoxy-ethyleneoxy-ethylene)-stearate; (3) N,N'-(ethyleneoxy-ethyleneoxy-ethyleneoxy-ethyleneoxy-ethylene)-stearate; (4) N,N'-(propyleneoxy-propyleneoxy-propylene)-stearate; (5) N,N'-(ethylene oxy-ethyleneoxy-ethylene)-laurate; (6) N,N'-(ethyleneoxy-ethyleneoxy-ethylene oxy-ethyleneoxy-ethylene)-laurate; (7) N,N'-(propyleneoxy-propyleneoxy-propylene)-laurate; (8) N,N'-propyleneoxy-propyleneoxy-propyleneoxy-propylene)-laurate, and (9) N,N'-propyleneoxy-propyleneoxy-propyleneoxy-propylene oxy-propylene)-laurate, present in the ink composition in amounts of between 4 percent by weight to about 80 percent by weight, per 100 percent by weight of said ink.

10. A conductive ink composition in accordance with claim 1 wherein in the conductive mixture the alkyleneoxide containing compound is a poly(oxyalkylene)-dialkylate selected from the group consisting of (1) N,N'-(ethyleneoxy-ethylene oxy-ethylene)-diacetate; (2) N,N'-propyleneoxy-propyleneoxy-propyleneoxy-propylene)-diacetate; (3) N,N'-propyleneoxy-propyleneoxy-propylene oxy-propyleneoxy-propylene)-diacetate; (4) N,N'-(ethyleneoxy-ethyleneoxy-ethylene)-distearate; (5) N,N'-(propyleneoxy-propyleneoxy-propylene)-distearate; (6) N,N'-propyleneoxy-propyleneoxy-propyleneoxy-propyleneoxy-propylene)-distearate; (7) N,N'-(ethyleneoxy-ethyleneoxy-ethyleneoxy-ethyleneoxy-ethylene)-dilaurate; (8) N,N'-(propyleneoxy-propyleneoxy-propylene)-dilaurate; (9) N,N'-propyleneoxy-propyleneoxy-propylene oxy-propylene)-dilaurate, and (10) N,N'-propyleneoxy-propyleneoxy-propyleneoxy-propyleneoxy-propylene)-dilaurate, present in the ink composition in amounts of between 4 percent by weight to about 80 percent by weight, per 100 percent by weight of said ink.

11. A conductive ink composition in accordance with claim 1 wherein in the conductive mixture the alkyleneoxide containing compound is selected from the group consisting of (1) methyl 3,6-dioxaheptanoate; (2) butyl 3,6-dioxaheptanoate heptyl 3,6-dioxaheptanoate; (3) octyl 3,6-dioxaheptanoate; (4) dodecyl 3,6-dioxaheptanoate; (5) stearyl 3,6-dioxaheptanoate; (6) ethyl 3,6,9-trioxadecanoate; (7) neopentyl 3,6,9-trioxadecanoate; (8) nonyl 3,6,9-trioxadecanoate; (9) decyl 3,6,9-trioxadecanoate, and (10) stearyl 3,6,9-trioxadecanoate, present in the ink composition in amounts of between about 4 percent by weight to about 80 percent by weight, per 100 percent by weight of said ink.

12. A conductive ink composition in accordance with claim 1 wherein in the conductive mixture the alkyleneoxide containing compound is selected from the group consisting of (1) dimethyl 3,6,9-trioxaundecanedioate; (2) diethyl 3,6,9-trioxaundecanedioate; (3) dipropyl 3,6,9-trioxaundecanedioate; (4) isopropyl 3,6,9-trioxaundecanedioate; (5) dibutyl 3,6,9-trioxaundecanedioate; (6) dihexyl 3,6,9-trioxaundecanedioate; (7) diheptyl 3,6,9-trioxaundecanedioate; (8) dioctyl 3,6,9-trioxaundecanedioate; (9) dinonyl 3,6,9-trioxaundecanedioate, and (10) didodecyl 3,6,9-trioxaundecanedioate, optionally present in the ink composition in amounts of between about 4 percent by weight to about 80 percent by weight, per 100 percent by weight of said ink.

13. A conductive ink composition in accordance with claim 1 wherein the alkyleneoxide compound is selected from the group consisting of (1) poly(oxymethylene); (2) poly(oxyethylene); (3) ethylene oxide/propylene oxide copolymers; (4) ethylene oxide/propylene oxide/ethylene oxide triblock copolymer; (5) propylene oxide/ethylene oxide/propylene oxide triblock copolymer; (6) ethylene oxide/2-hydroxyethyl methacrylate/ethylene oxide; (7) ethylene oxide/hydroxypropyl methacrylate/ethylene oxide triblock copolymer; (8) ethylene oxide/4-vinyl pyridine/ethylene oxide triblock copolymers; (9) ionene/ethyleneoxide/ionene triblock copolymer; (10) ethylene oxide/isoprene/ethylene oxide triblock copolymer; and (11) epichlorohydrin-ethyleneoxide copolymer, present in the ink composition in amounts of between about 4 percent by weight to about 80 percent by weight, per 100 percent by weight of said ink.

14. A conductive ink composition in accordance with claim 1 wherein the polymeric binder is present in an amount of from about 35 percent by weight to about 4 percent by weight and is selected from the group consisting of (1) polyethylene monocarboxylic acid; (2) poly(ethylene-co-acrylic acid); (3) poly(sebacic anhydride); (4) poly (azelaic anhydride); (5) poly(maleic anhydride-alt-1-tetradecene; (6) polyethylene-graft-maleic anhydride; (5) poly(ethylene-co-butylacrylate-co-maleic anhydride); (6) poly(hexamethylene sebacate); (7) poly(1,6-hexamethylene adipate); (8) polyethylene succinate; (9) polyethylene monoalcohol; (10) polyethylene-block-poly(ethylene glycol); and (11) polyethylene oxidized.

15. A conductive ink composition in accordance with claim 1 wherein the lightfastness component is selected from the group consisting of (1) 1,1-(1,2-ethane-diyl)bis(3, 3,5,5-tetramethyl piperazinone); (2) 2,2,4-trimethyl-1,2-hydro quinoline; (3) 2-(4-benzoyl-3-hydroxyphenoxy) ethylacrylate; (4) 2-dodecyl-N-(1,2,2,6,6-pentamethyl-4-piperidinyl) succinimide; (5) 2,2,6,6-tetramethyl-4-piperidinyl/β,β,β',β'-tetramethyl-3,9-(2,4,8,10-tetraoxospiro (5,5)-undecane)diethyl-1,2,3,4-butane tetracarboxylate, optionally present in amounts of from about 0.25 percent by weight to about 10 percent by weight.

16. A conductive ink composition in accordance with claim 1 wherein the lightfast antioxidant is selected from the group consisting of (1) antimony dialkyl phosphorodithioate; (2) molybdenum oxysulfide dithio carbamate; (3) nickel-bis(o-ethyl(3,5-di-tert-butyl-4-hydroxybenzyl) phosphonate; (4) 4,4'-methylene-bis(dibutyldithio carbamate), and (5) tetra sodium-N-(1,2-dicarboxyethyl)-N-octadecyl sulfosuccinamate, optionally present in an amount of from about 0.25 percent by weight to about 10 percent by weight.

17. A printing process which comprises incorporating into an acoustic ink jet printer the ink of claim 1, and which ink possesses an acoustic-loss value of from about 10 to about 80 dB/mm, a viscosity of from about 1 centipoise to about 10 centipoise, and said conductivity is from about 6.0 to about 6.5 at a temperature of from about 125° C. to about 165° C.; and causing droplets of the ink to be ejected in imagewise pattern onto a substrate.

18. A process which comprises (a) providing an acoustic ink printer having a pool of the liquid ink of claim 1 with a free surface, and a printhead including at least one droplet ejector for radiating the free surface of said ink with focused acoustic radiation to eject individual droplets of ink therefrom on demand, said radiation being brought to focus with a finite waist diameter in a focal plane; and causing droplets of the ink to be ejected in imagewise pattern onto a substrate.

19. A conductive ink composition in accordance with claim 1 wherein the colorant is a pigment, or a dye present in an amount of from about 0.5 to about 20 percent by weight.

20. A conductive ink composition in accordance with claim 1 wherein the colorant is a pigment of carbon black, cyan, magenta, yellow, black, or mixtures thereof.

21. A conductive ink composition in accordance with claim 1 wherein the conductive mixture is present in an amount of from about 5 to about 95 percent by weight, the urea compound is urea, 1-allyl urea or butyl urea; a thiourea compound of 1-allyl-2-thiourea, 1-methyl-2-thiourea, thiourea is present, and the alkyleneoxide compound is selected from the group consisting of N,N'-(ethyleneoxy-ethyleneoxy-ethyleneoxy-ethyleneoxy-ethylene)-bis-stearamide, N,N'-(ethyleneoxy-ethyleneoxy-ethyleneoxy-ethyleneoxy-ethylene)-dilaurate, stearyl 3,6,9-trioxadecanoate; the polymeric binder possessing a melting point of from about 60° C. to about 115° C. and present in an amount of from about 35 to about 4 percent by weight is selected from the group consisting of polyethylene monoalcohol, polyethylene-block-poly(ethylene glycol), polyethylene oxidized; the lightfastness component present in an amount of from about 20 to about 0.25 percent by weight is selected from the group consisting of 2-dodecyl-N-(2,2,6,6-tetramethyl-4-piperidinyl) succinimide, and [1,2, 2,6,6-pentamethyl-4-piperidinyl/β,β,β',β'-tetramethyl-3,9-(2,4,8,10-tetraoxo spiro (5,5) undecane)diethyl]-1,2,3,4-butane tetracarboxylate; the antioxidant present in an amount of from about 20 to about 0.25 percent by weight is tetra-sodium-N-(1,2-dicarboxyethyl)-N-octadecyl-sulfo succinamate, molybdenum or oxysulfide dithio carbamate, and the colorant is present in an amount of from about 20 to about 0.5 percent by weight.

22. A conductive ink in accordance with claim 21 with a conductivity of from about 6.0 to about 6.5 [log(pico.mho/cm)], a viscosity of from about 1 centipoise to about 10 centipoise, and which ink yields images with crease values of between about 2 to about 7, haze values of between about 5 to about 10, gloss values between about 85 to about 90.

23. A conductive ink composition in accordance with claim 1 with a conductivity of from about 6 to about 6.5 [log(pico.mho/cm)], a viscosity of from about 1 centipoise to about 10 centipoise, and which ink yields images with crease values of between about 2 to about 7, haze values of between about 5 to about 10, gloss values between about 85 to about 90.

24. A conductive ink composition in accordance with claim 1 further containing a metal salt thereby forming a complex with said oxyalkylene, which oxyalkylene is a polymer.

25. A conductive ink composition in accordance with claim 1 wherein a complex is formed between said urea compound and said alkylene oxide containing oxyalkylene compound.

26. A conductive ink composition in accordance with claim 25 wherein the complex is of the formula

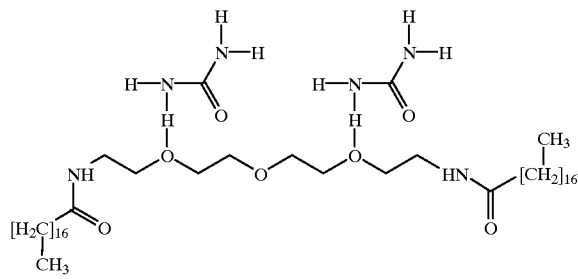

* * * * *